(12) United States Patent
Ozeki et al.

(10) Patent No.: US 11,143,922 B2
(45) Date of Patent: Oct. 12, 2021

(54) DISPLAY DEVICE

(71) Applicant: Japan Display Inc., Minato-ku (JP)

(72) Inventors: Yoshitaka Ozeki, Tokyo (JP); Seiji Uejima, Tokyo (JP); Nobutaka Ozaki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/921,213

(22) Filed: Jul. 6, 2020

(65) Prior Publication Data

US 2020/0333646 A1    Oct. 22, 2020

Related U.S. Application Data

(63) Continuation of application No. 16/279,700, filed on Feb. 19, 2019, now Pat. No. 10,747,067.

(30) Foreign Application Priority Data

Feb. 20, 2018    (JP) .............................. JP2018-027937

(51) Int. Cl.
    *G02F 1/1343*    (2006.01)
    *G02F 1/1362*    (2006.01)
    *G02F 1/1333*    (2006.01)
    *G09G 3/36*     (2006.01)

(52) U.S. Cl.
    CPC ...... *G02F 1/1343* (2013.01); *G02F 1/133345* (2013.01); *G02F 1/136286* (2013.01); *G09G 3/36* (2013.01)

(58) Field of Classification Search
    CPC ............ G02F 1/1343; G02F 1/136286; G02F 1/136227; G02F 1/134372; G02F 1/1368; H01L 27/124; H01L 27/3248; H01L 27/1251

See application file for complete search history.

(56) References Cited

U.S. PATENT DOCUMENTS

2009/0059110 A1*   3/2009   Sasaki ............... G02F 1/133514
    349/39
2015/0029433 A1*   1/2015   Takizawa ............. G02F 1/1345
    349/43
2017/0329176 A1*  11/2017   Kawabuchi ....... G02F 1/136209

\* cited by examiner

*Primary Examiner* — Angela K Davison
(74) *Attorney, Agent, or Firm* — Oblon, McClelland, Maier & Neustadt, L.L.P.

(57) ABSTRACT

According to one embodiment, a display device includes a substrate, a switching element provided on the substrate and including a relay electrode, a first electrode provided further away from the substrate than the switching element, a first insulating film provided on the first electrode and having a first thickness, a second electrode provided on the first insulating film, a second insulating film provided on the second electrode and having a second thickness and a third electrode provided on the second insulating film and supplied with a same potential as that of the first electrode. The second thickness is greater than the first thickness.

20 Claims, 25 Drawing Sheets

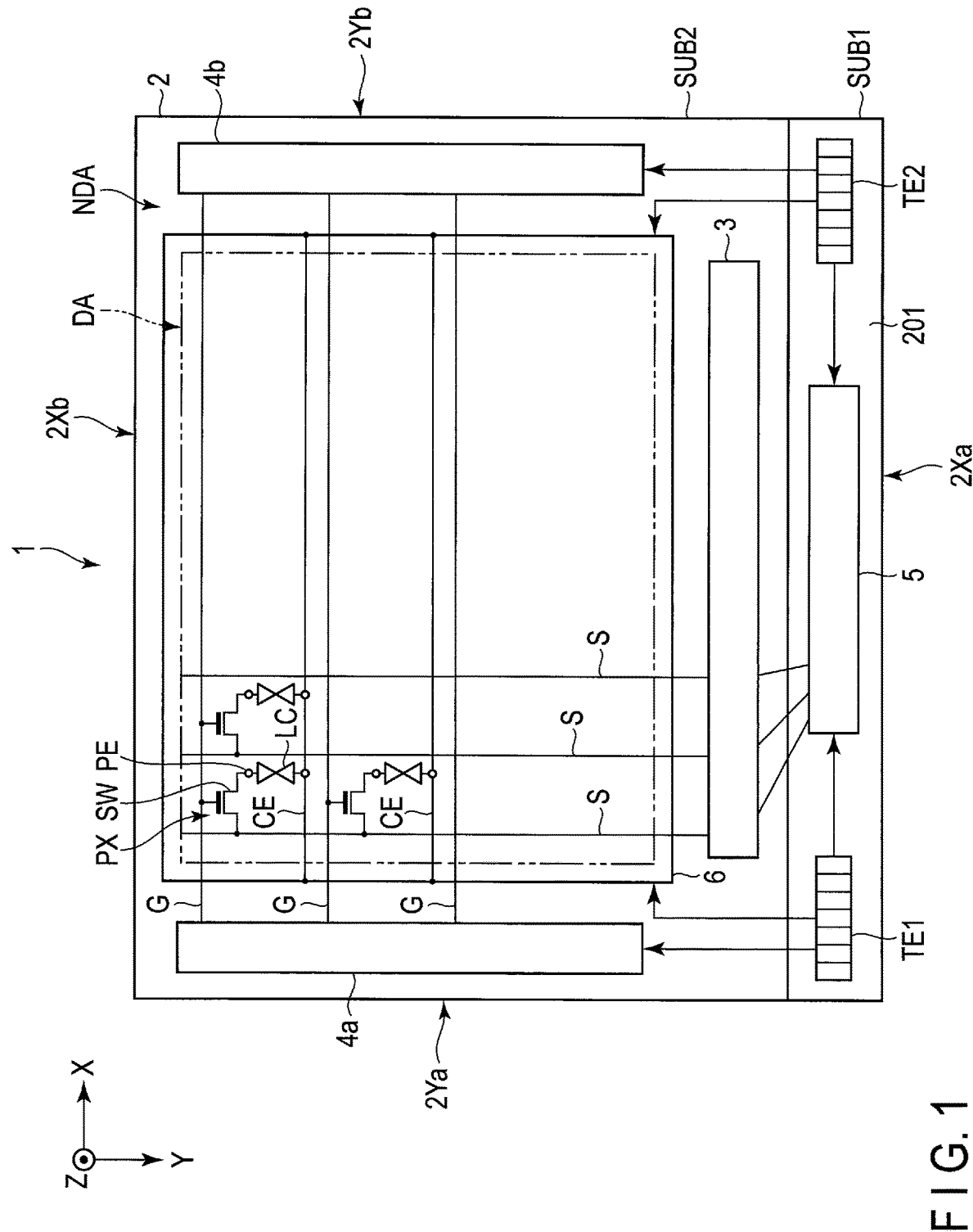
F I G. 1

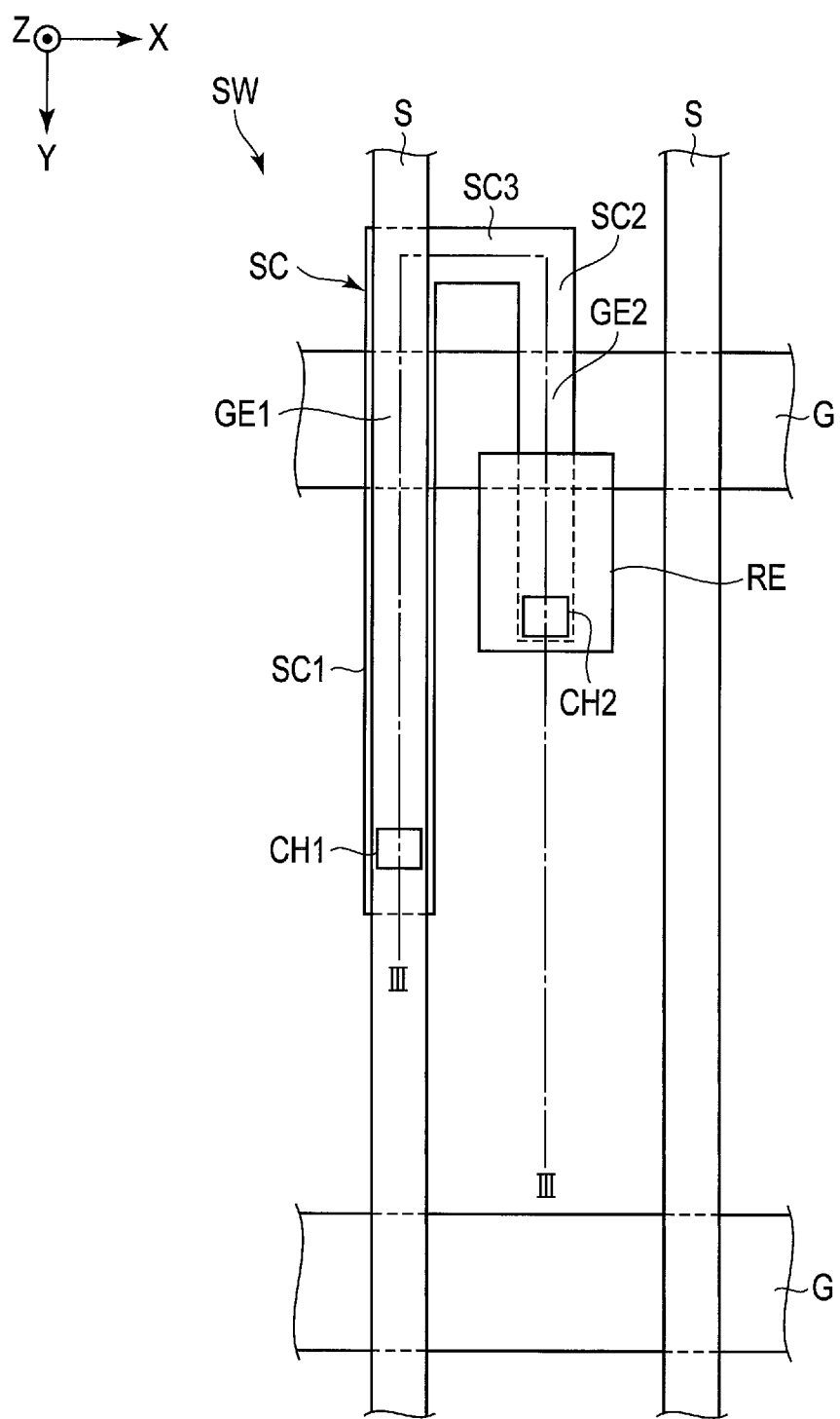
F I G. 2

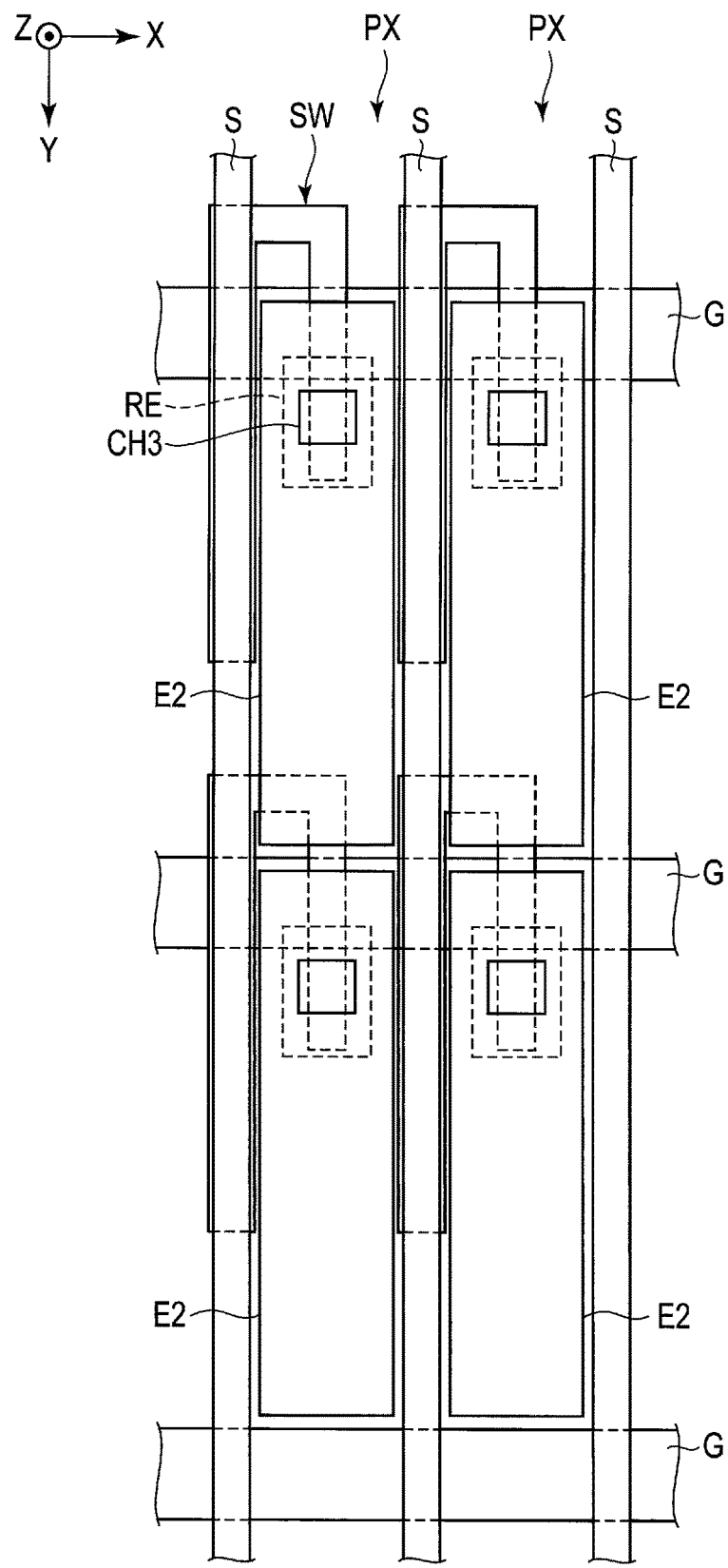
F I G. 5

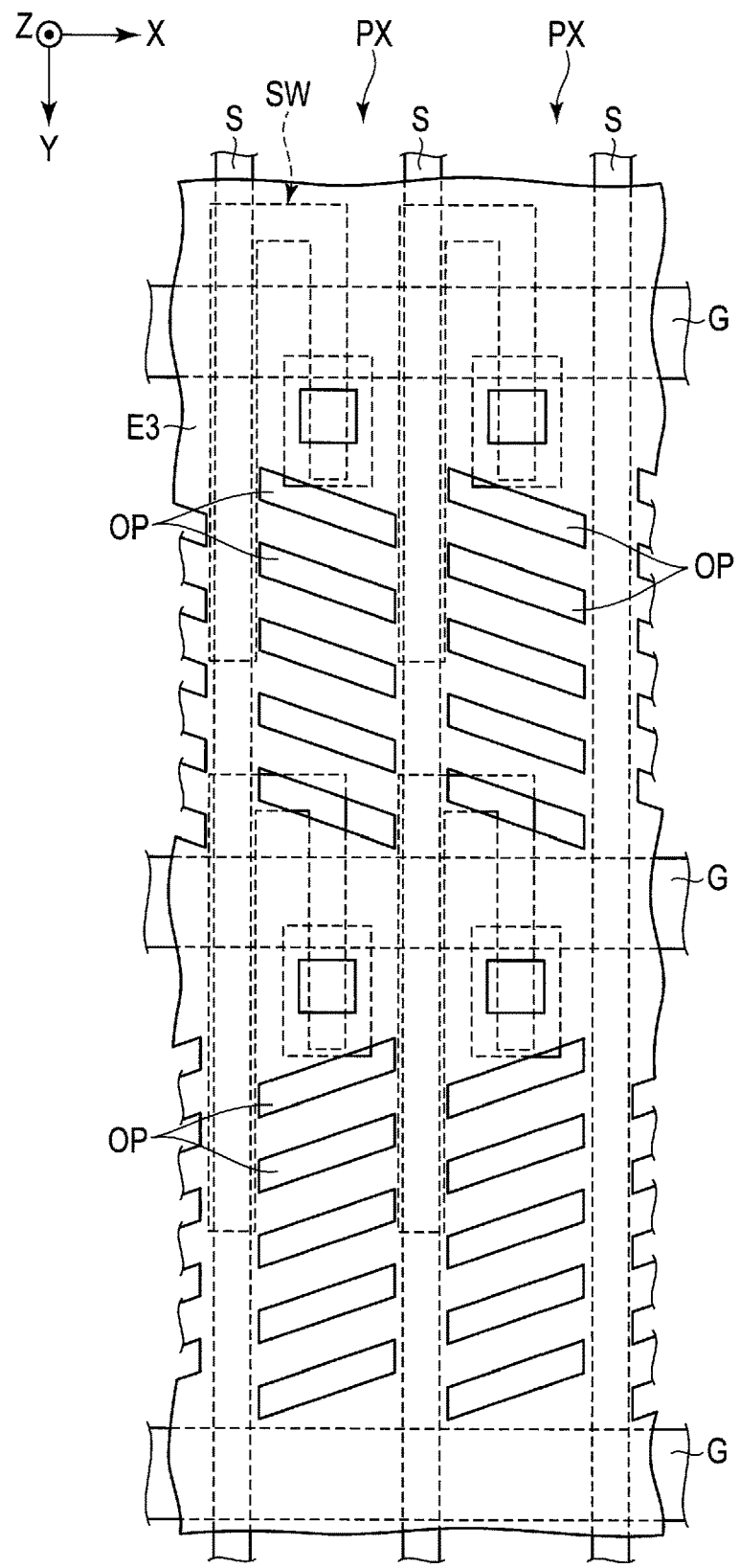
F I G. 10

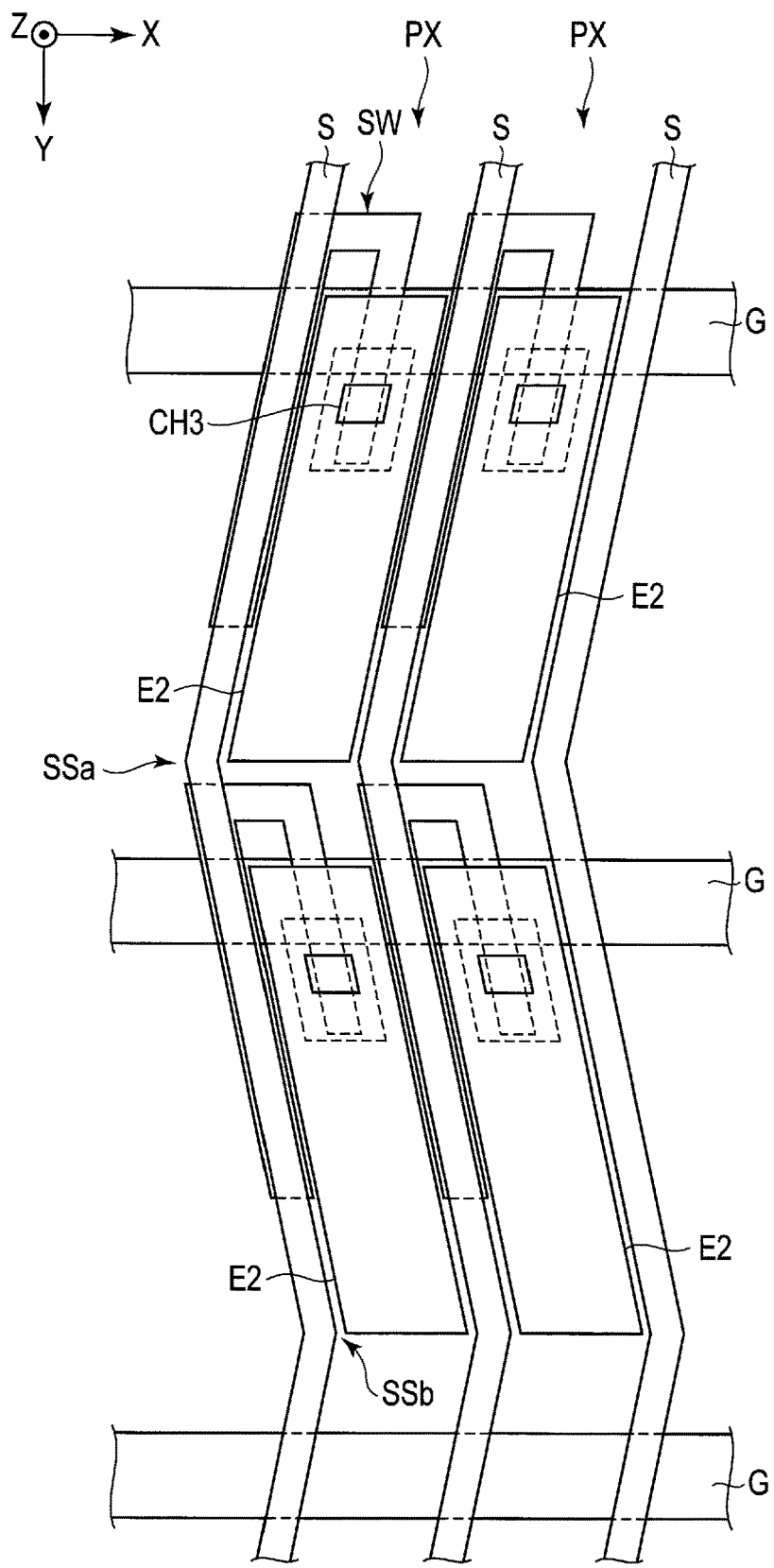
F I G. 12

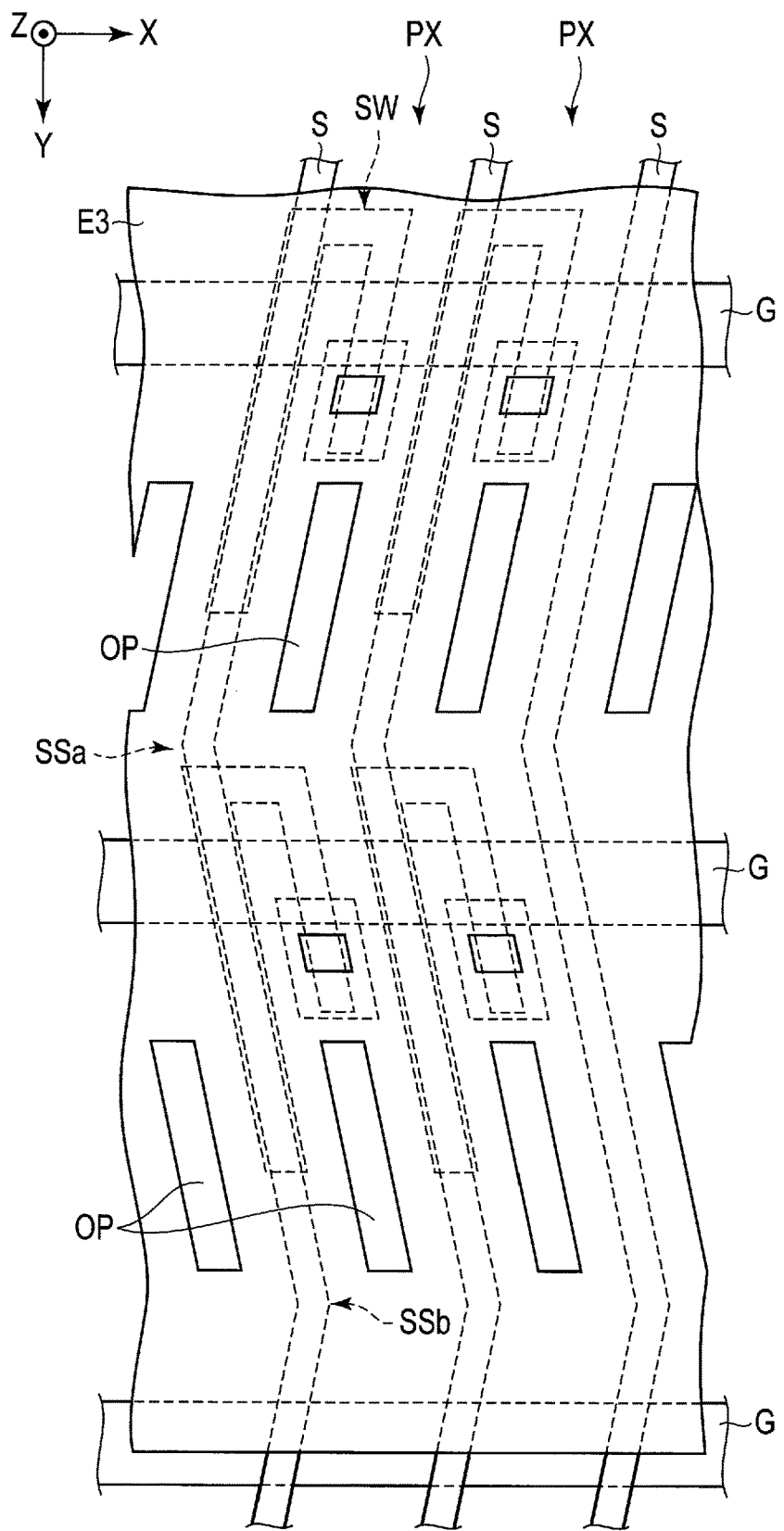
F I G. 13

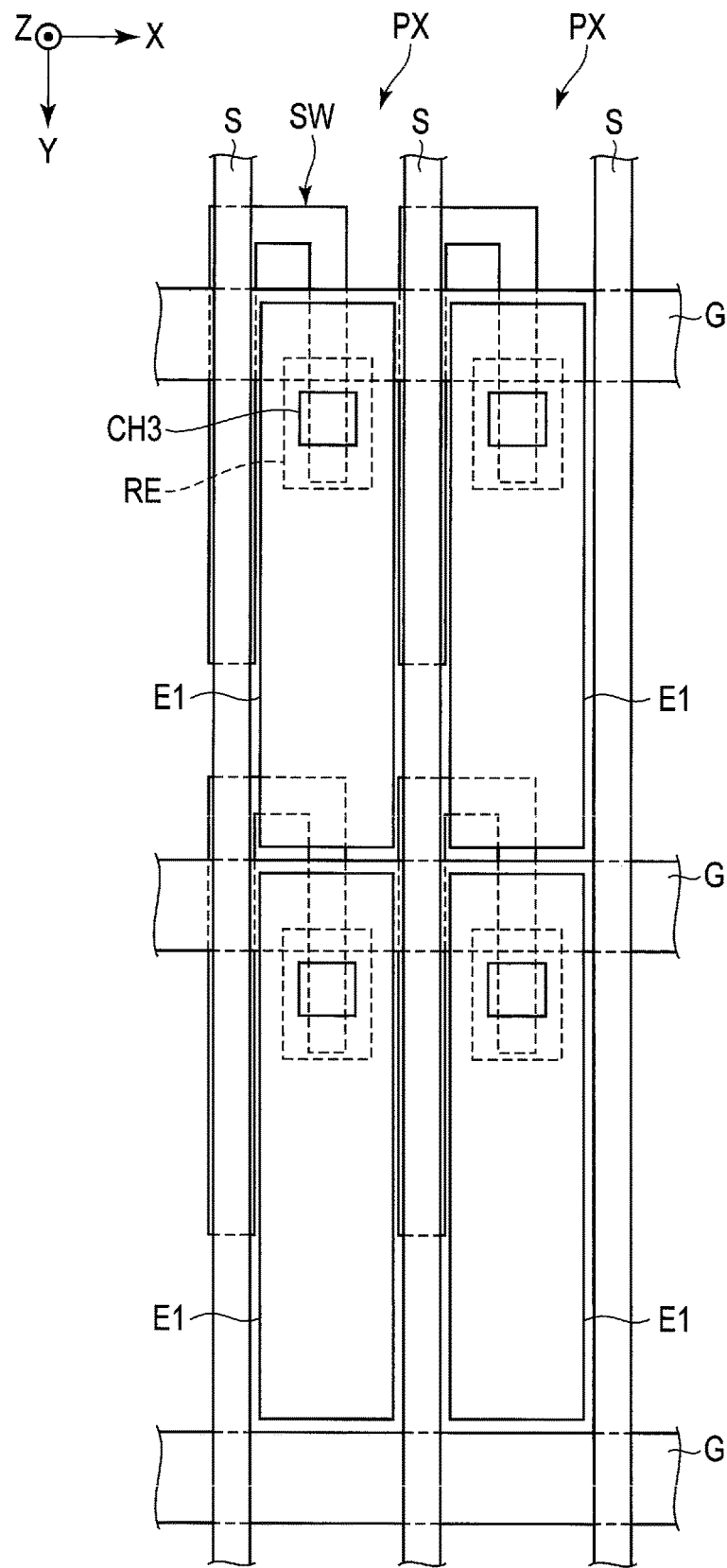
F I G. 16

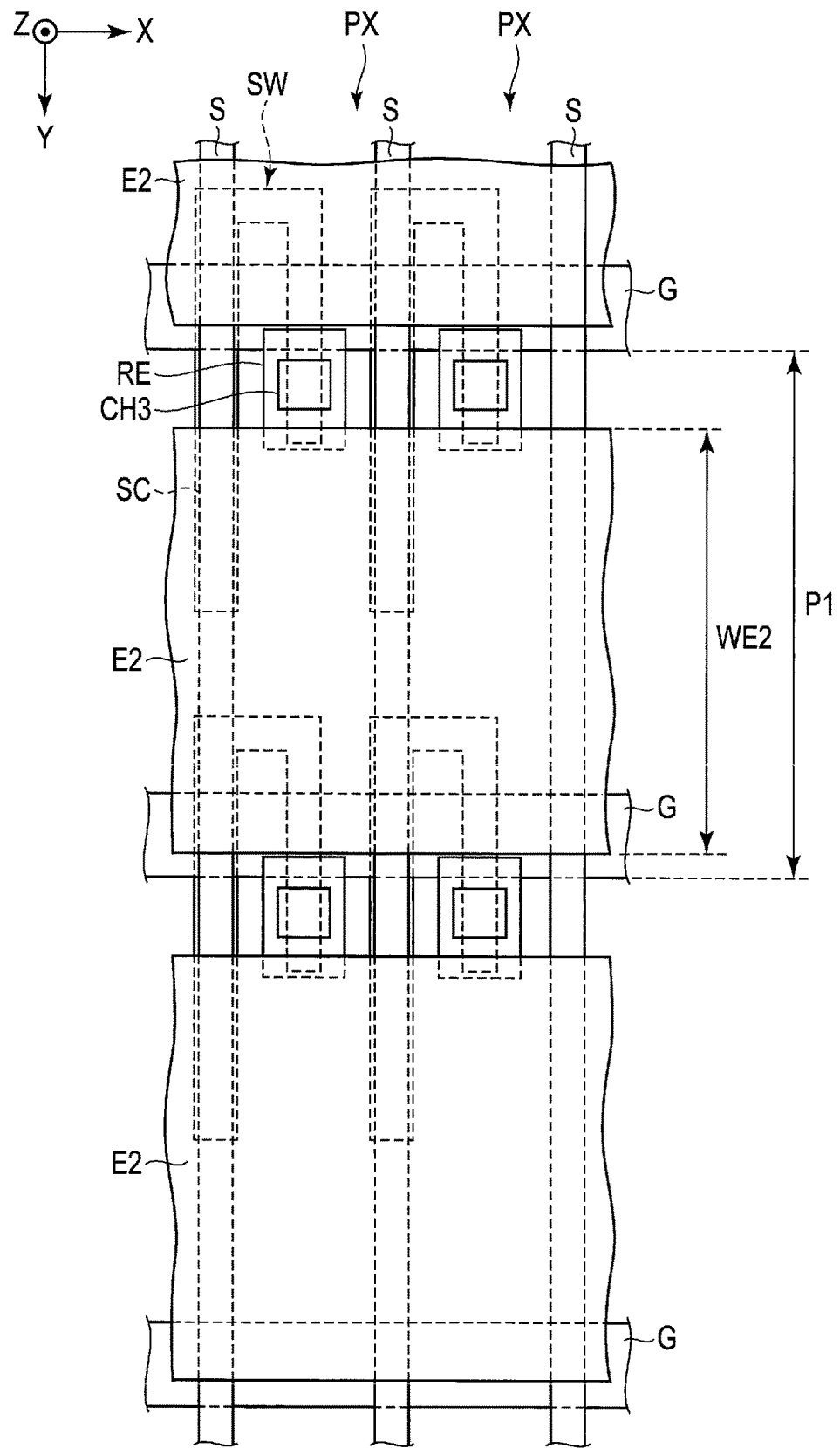
F I G. 17

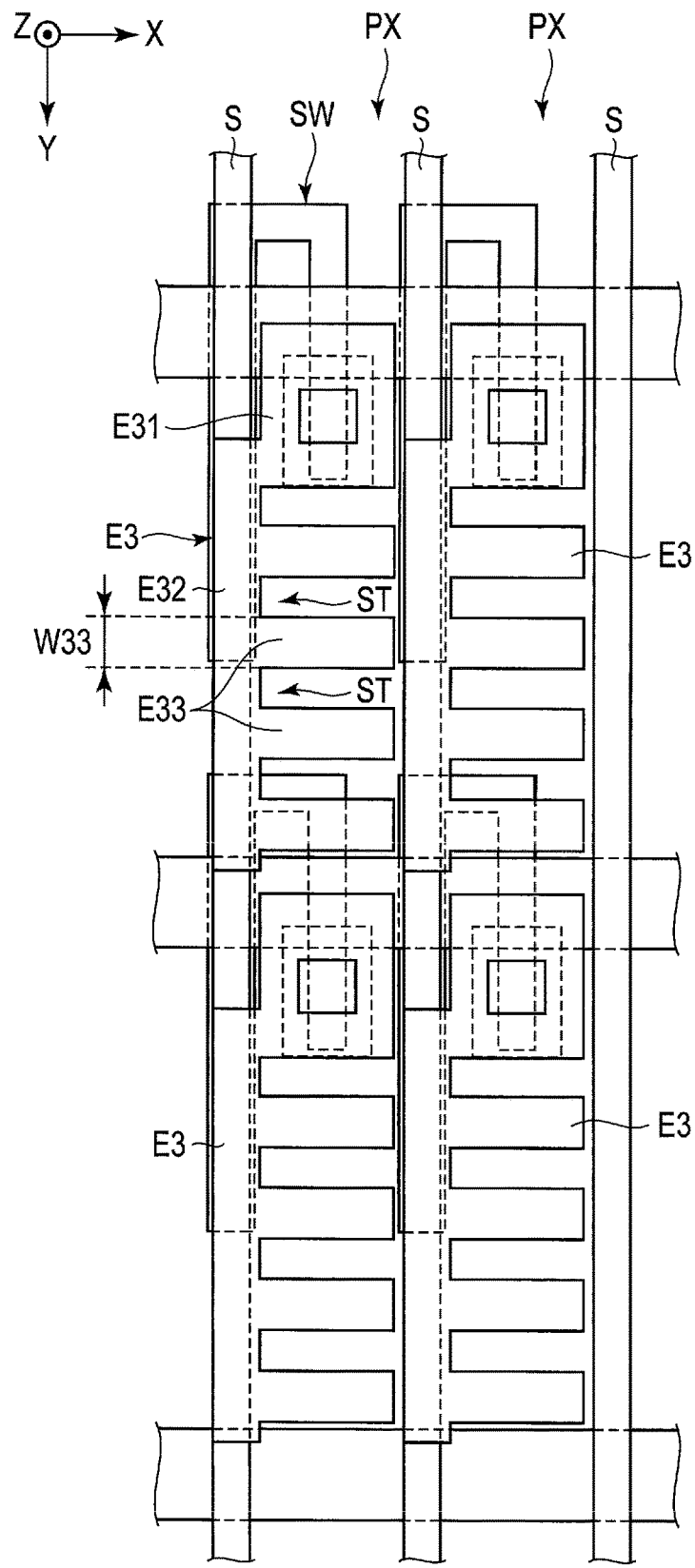
F I G. 18

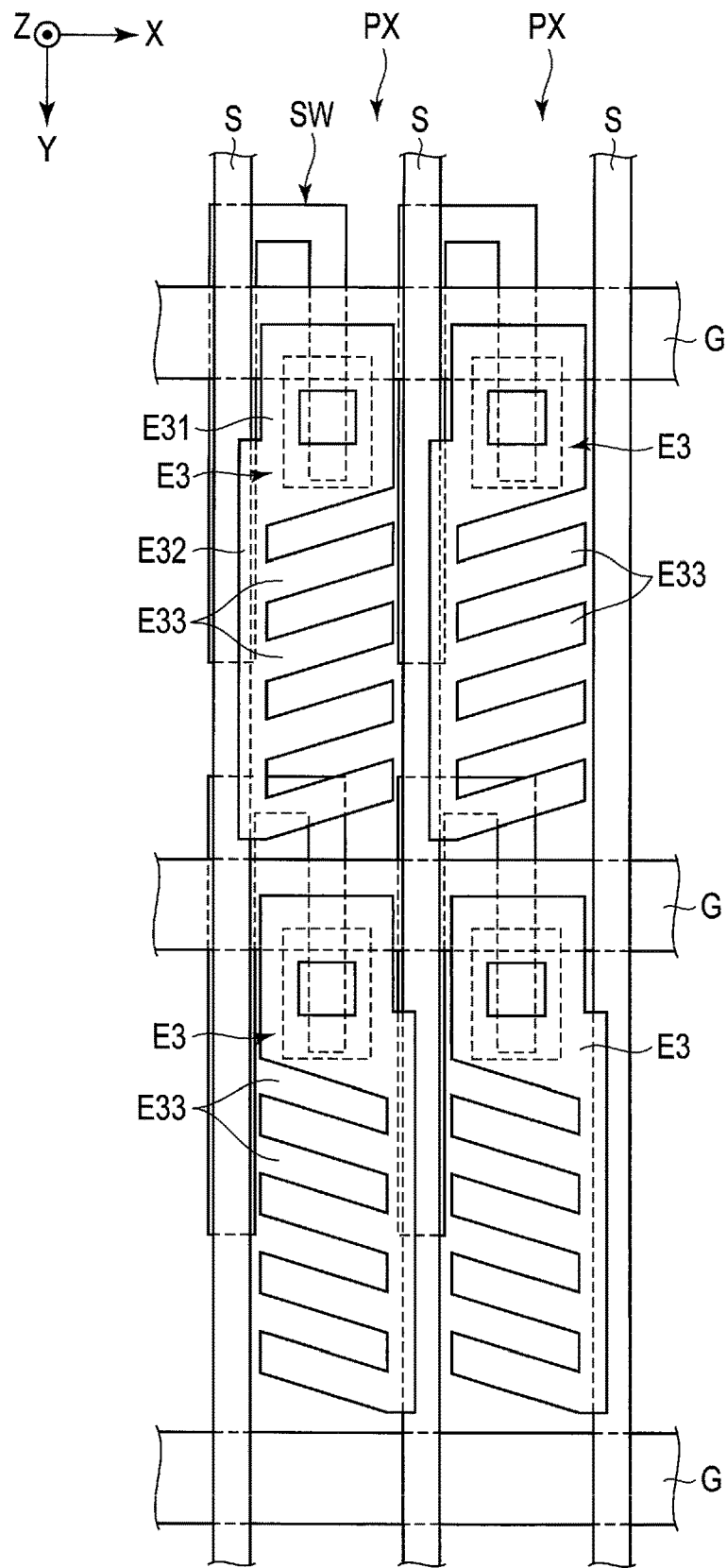
F I G. 22

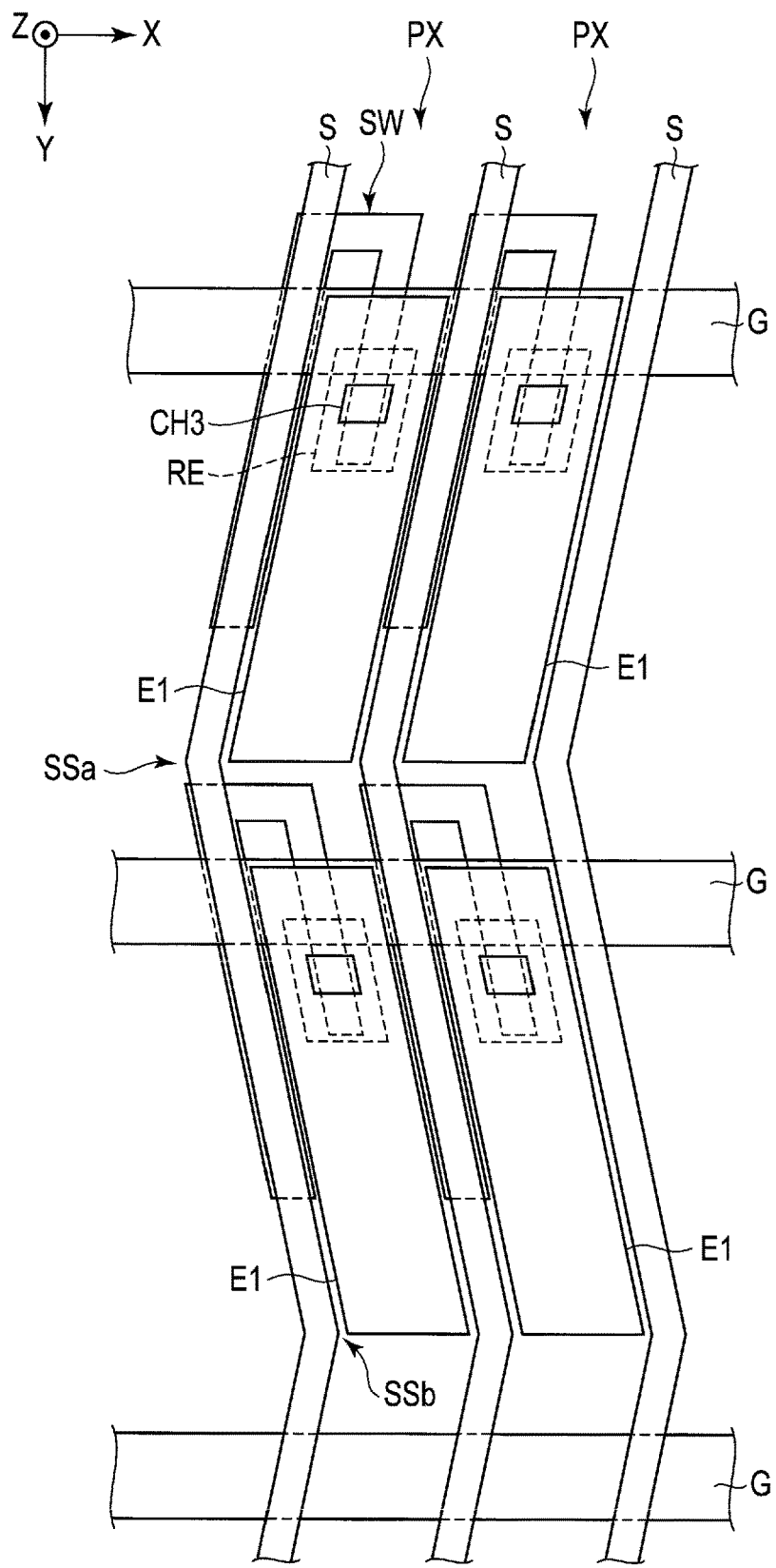
F I G. 24

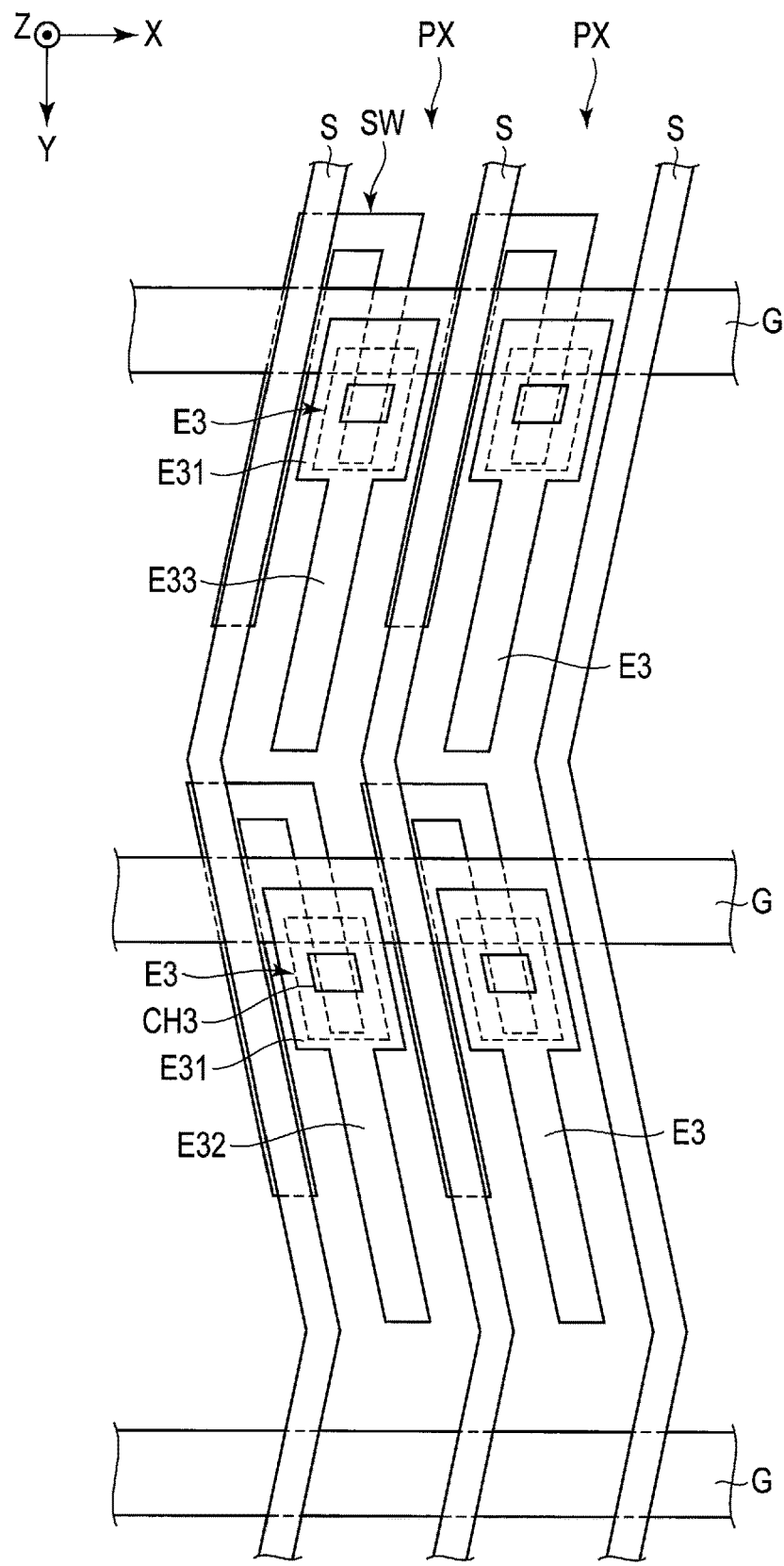
F I G. 25

US 11,143,922 B2

DISPLAY DEVICE

CROSS-REFERENCE TO RELATED APPLICATIONS

This application is a continuation of U.S. application Ser. No. 16/279,700 filed Feb. 19, 2019, and is based upon and claims the benefit of priority from Japanese Patent Application No. 2018-027937, filed Feb. 20, 2018, the entire contents of each of which are incorporated herein by reference.

FIELD

Embodiments described herein relate generally to a display device.

BACKGROUND

For example, in liquid crystal display devices, a common electrode and a pixel electrode, which oppose each other while interposing an insulating layer, form a capacitor to holding the potential applied to a liquid crystal layer. In recent years, as the size of the liquid crystal display devices is drastically reduced, the area of the pixel electrode is accordingly reduced. Under these circumstances, as the downsizing further progresses, it becomes difficult to form a sufficient capacitor in each pixel.

BRIEF DESCRIPTION OF THE DRAWINGS

FIG. 1 is a plan view showing a basic structure and an equivalent circuit of a display device according to the first embodiment.

FIG. 2 is a plan view showing a configuration example of a switching element SW shown in FIG. 1.

FIG. 5 is a plan view showing a configuration example of a second electrode E2 shown in FIG. 3.

FIG. 10 is a plan view of a second modified example of the first embodiment.

FIG. 12 is a plan view of a second electrode E2 in the third modified example of the first embodiment.

FIG. 13 is a plan view of a third electrode E3 in the third modified example of the first embodiment.

FIG. 16 is a plan view showing a configuration example of a first electrode E1 shown in FIG. 15.

FIG. 17 is a plan view showing a configuration example of a second electrode E2 shown in FIG. 15.

FIG. 18 is a plan view showing a configuration example of a third electrode E3 shown in FIG. 15.

FIG. 22 is a plan view of a second modified example of the second embodiment.

FIG. 24 is a plan view of a first electrode E1 in the third modified example of the second embodiment.

FIG. 25 is a plan view of a third electrode E3 in the third modified example of the second embodiment.

DETAILED DESCRIPTION

Figure 3:
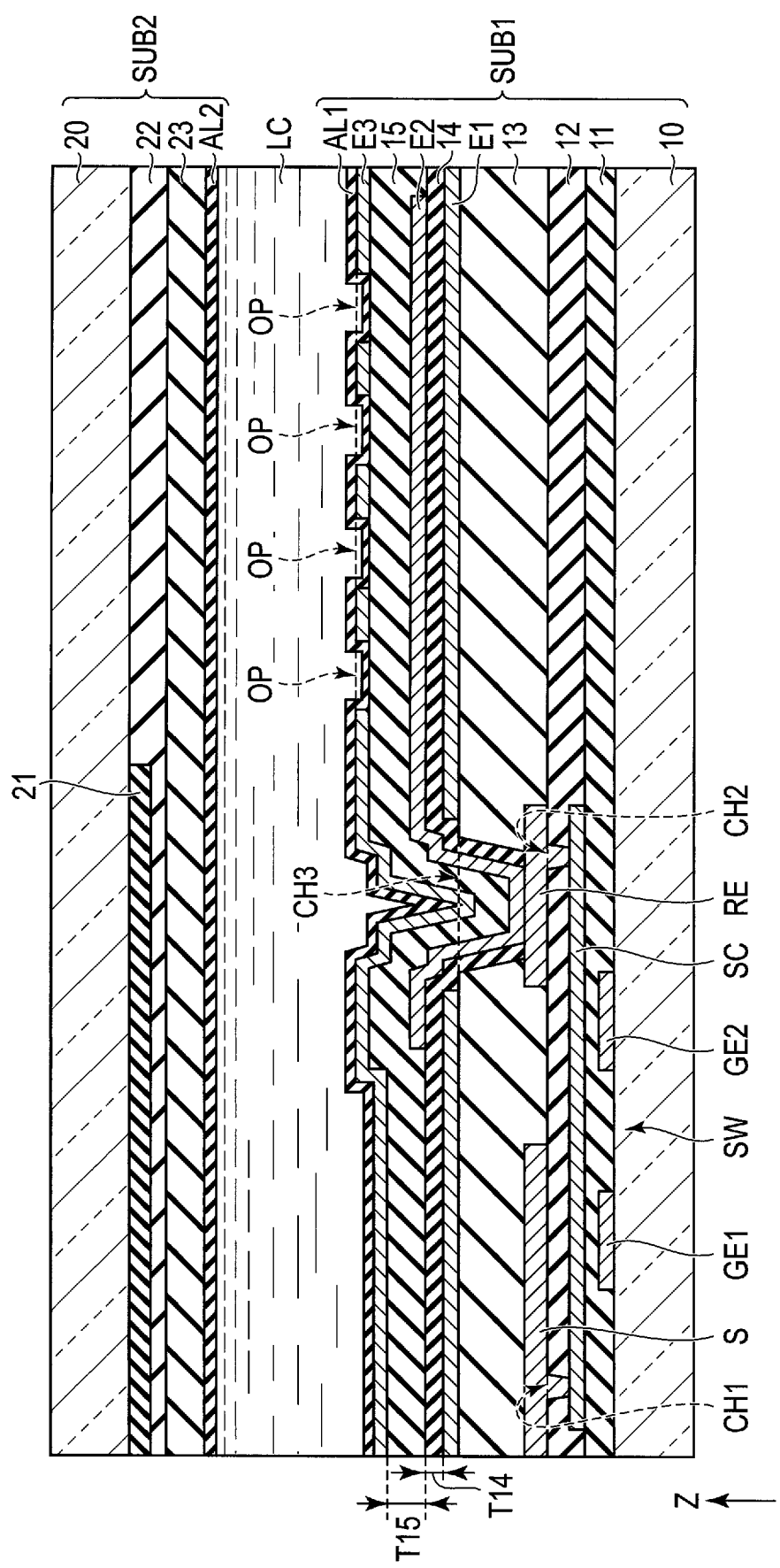
FIG. 3 is a cross section taken along line III-III shown in FIG. 3.

In general, according to one embodiment, a display device comprises a substrate, a switching element provided on the substrate and including a relay electrode, a first electrode provided further away from the substrate than the switching element, a first insulating film provided on the first electrode and having a first thickness, a second electrode provided on the first insulating film, a second insulating film provided on the second electrode and having a second thickness and a third electrode provided on the second insulating film and supplied with a same potential as that of the first electrode, and the second thickness is greater than the first thickness.

The embodiments will be described hereinafter with reference to the accompanying drawings. Note that the disclosure is presented for the sake of exemplification, and any modification and variation conceived within the scope and spirit of the invention by a person having ordinary skill in the art are naturally encompassed in the scope of invention of the present application. In addition, in some cases, in order to make the description clearer, the widths, thicknesses, shapes, etc., of the respective parts are schematically illustrated in the drawings as compared to the actual modes. However, the schematic illustration is merely an example, and adds no restrictions to the interpretation of the invention. Moreover, in the specification and drawings, the structural elements, which have functions identical or similar to the functions described in connection with preceding drawings, are denoted by like reference numbers, and an overlapping detailed description thereof is omitted unless otherwise necessary.

First Embodiment

FIG. 1 is a plan view showing a basic structure and an equivalent circuit of a display device according to the first embodiment. In the figure, a first direction X and a second direction Y are directions intersecting each other, and a third direction Z is a direction intersecting the first direction X and the second direction Y. For example, the first direction X, the second direction Y and the third direction Z are orthogonal to each other, but they may cross each other at an angle other than 90 degrees. In this specification, the direction towards the tip of the arrow which shows the third direction Z is referred to as "up", and the direction which goes conversely from the tip of the arrow is referred to as "down". Further, when it is assumed that an observation position at which the display device DSP is to be observed is located at the pointing end side of the arrow indicating the third direction Z, a view toward an X-Y plane defined by the first direction X and the second direction Y is referred to as a plan view.

A display device 1 comprises a display panel 2. The display panel 2 is, for example, a liquid crystal display panel. In the example illustrated, the display panel 2 is approximately rectangular, and includes end portions 2Xa and 2Xb extending along the first direction X, and end portions 2Ya and 2Yb extending along the second direction Y. The display panel 2 comprises a first substrate SUB1, a second substrate SUB2 and a liquid crystal layer LC. The first substrate SUB1 and the second substrate SUB2 oppose each other and are adhered together via a sealing material. The liquid crystal layer LC is held between the first substrate SUB1 and the second substrate SUB2, and functions as a display element. The display panel 2 includes a mounting portion 201 in which the first substrate SUB1 extends further from the second substrate SUB2. In the example illustrated, the mounting portion 201 is formed along the end portion 2Xa.

The display panel 2 includes a display area DA which displays images and a non-display area NDA located on an outer side of the display area DA. The display area DA is located in a region where the first substrate SUB1 and the second substrate SUB2 overlap each other, and is equivalent to the region where the liquid crystal layer LC is provided. In the example illustrated, the non-display area NDA is formed into a frame shape which surrounds the display area DA.

The display panel 2 comprises a plurality of scanning lines G and a plurality of signal lines S in the display area DA. In the example illustrated, the scanning lines G extend along the first direction X, and are arranged along the second direction Y at intervals. The signal lines S extend along the second direction Y, and are arranged along the first direction at intervals. Further, the display panel 2 comprises pixels PX respectively in vicinities of intersections between the scanning lines G and the respective signal line S. Here, a pixel PX is equivalent to a minimum unit individually controllable with respect to an image signal. In the example illustrated, the pixels PX are arranged in a matrix along in the first direction X and the second direction Y.

Each pixel PX comprises a switching element SW, a pixel electrode PE, a common electrode CE and a liquid crystal layer LC. The switching element SW is electrically connected to a scanning line G and a signal line S. A signal potential supplied to the signal line S is supplied to the pixel electrode PE via the switching element SW. The common electrode CE is disposed over a plurality of pixels PX. The liquid crystal layer LC is driven by an electric field produced between the pixel electrode PE and the common electrode CE. In this embodiment, the display area DA is equivalent to the region where the pixel electrode PE is disposed.

The display panel 2 comprises a potential supply line 6 in the non-display area NDA. In the example illustrated, the potential supply line 6 is formed into an approximately rectangular shape to surround the display area DA. In other words, the potential supply line 6 surrounds all the pixel electrodes PE. To the potential supply line 6, a common potential is supplied via terminal portions TE1 and TE2 formed in the mounting portion 201. In this embodiment, the common electrode CE extends to the non-display area NDA, and is connected to the potential supply line 6 in the non-display area NDA. In the example illustrated, the common electrode CE extends along the first direction X. Note that such a structure that the potential supply line 6 does not surround a part of the display area DA, that is, for example, the potential supply line 6 is not formed along a lower side portion (a side on an end portion 2Xa side) of the display area DA, but provided only along the three remaining sides may as well be adopted.

Further, the display panel 2 comprises a source driver 3, gate drivers 4a and 4b, a driver IC 5, etc., in the non-display area NDA. The source driver 3, the gate drivers 4a and 4b, and the driver IC 5 are located on an outer side with respect to the potential supply line 6. For example, the source driver 3 is provided between the mounting portion 201 and the potential supply line 6. The gate driver 4a is provided between the end portion 2Ya and the potential supply line 6. The gate driver 4b is provided between the end portion 2Yb and the potential supply line 6. The signal lines S extend to the non-display area NDA, and are connected to the source driver 3. The scanning lines G extend to the non-display area NDA, and are connected to the gate drivers 4a and 4b. The driver IC 5 is mounted in the mounting portion 201. The driver IC 5 controls the source driver 3 and the gate drivers 4a and 4b.

FIG. 2 is a plan view diagram showing a configuration example of the switching element SW shown in FIG. 1. The switching element SW is, for example, a double-gate thin film transistor. The switching element SW includes a semiconductor layer SC, gate electrodes GE1 and GE2, a relay electrode RE and the like.

The semiconductor layer SC includes a first portion SC1, a second portion SC2 and a third portion SC3. The first portion SC1 is located directly under the respective signal line S. The first portion SC1 extends along the second direction Y, and intersects the respective scanning line G. The second portion SC2 is located between signal lines S adjacent to each other. The second portion SC2 extends along the second direction Y, and intersects the respective scanning line G. The third portion SC3 extends along the first direction X, and connects the first portion SC1 and the second portion SC2 to each other. Note that a part of the second portion SC2 and the third portion SC3 are located in a pixel PX adjacent along the second direction Y to a pixel PX corresponding to the switching element SW.

The semiconductor layer SC is connected to the respective signal line S in a contact hole CH1. The signal lines S each function as, for example, a source electrode of the respective switching element SW. Further, the semiconductor layer SC is connected to the relay electrode RE in a contact hole CH2. The relay electrode RE functions as a drain electrode of the respective switching element SW. The gate electrode GE1 is equivalent to a part of the respective scanning line G, which overlaps the first portion SC1. The gate electrode GE2 is equivalent to a part of the respective scanning line G, which overlaps the second portion SC2.

FIG. 3 is a cross section taken along the line III-III shown in FIG. 2. The first substrate SUB1 comprised an insulating substrate 10, a switching element SW, insulating films 11 to 15, a first electrode E1, a second electrode E2, a third electrode E3, an alignment film AL1 and the like.

In the example illustrated, the switching element SW is a bottom-gate thin film transistor. The switching element SW includes gate electrodes GE1 and GE2, a semiconductor layer SC, and a relay electrode RE1. The gate electrodes GE1 and GE2 are formed on the insulating substrate 10, and are covered by the insulating film 11. The semiconductor layer SC is formed on the insulating film 11, and is covered by the insulating film 12. The signal line S and the relay electrode RE are formed on the insulating film 12, and are covered by the insulating film (organic insulating film) 13. In the contact holes CH1 and CH2 which penetrate the insulating film 12, the signal line S and the relay electrode RE are each in contact with the semiconductor layer SC.

The first semiconductor layer SC is formed of, for example, polycrystalline silicon. The gate electrodes GE1 and GE2, the relay electrode RE and the signal line S are each formed from, for example, a metal material such as aluminum (Al), titanium (Ti), silver (Ag), molybdenum (Mo), tungsten (W), copper (Cu) and chromium (Cr), or an alloy of any combination of these metal materials. The gate electrodes GE1 and GE2, the relay electrode RE, and the signal line S may be of a single- or multi-layer structure.

The insulating film 13 includes a contact hole (third through hole) CH3 which penetrates to the relay electrode RE. The first electrode E1 is formed on the insulating film 13 except for the vicinity of the contact hole CH3. The insulating film (first insulating film) 14 covers the first electrode E1 and is formed also on the insulating film 13. A part of the insulating film 14 extends into the contact hole CH3 and uncovers a part of the relay electrode RE. The second electrode E2 is formed on the insulating film 14. The second electrode E2 is in contact with the relay electrode RE in the contact hole CH3. With this structure, the signal potential supplied to the signal line S is supplied to the second electrode E2 via the relay electrode RE.

The insulating film (second insulating film) 15 covers the second electrode SE2. The insulating film 15 is formed also in the contact hole CH3. In the illustrated example, the insulating film 15 is formed also on the insulating film 14. The third electrode E3 is formed on the insulating film 15. For example, the third electrode E3 includes a plurality of openings OP. The openings OP each oppose the second electrode E2. The third electrode E3 is covered by the alignment film AL1. The alignment film AL1 is provided also on the insulating film 15 in the openings OP.

The insulating films 11, 12, 14 and 15 are each formed from, for example, an inorganic insulating material such as silicon oxide, silicon nitride or silicon oxynitride. The insulating film 13 is formed of, for example, an organic insulating material such as polyimide. Note that the insulating films 14 and 15 may be formed of an organic insulating material. In this embodiment, the insulating film 15 has a thickness (second thickness) T15, which is greater than a thickness (first thickness) T14 of the insulating film 14. For example, the thickness T15 is two times or more the thickness T14.

The first electrodes E1, the second electrode E2 and the third electrode E3 are formed of, for example, a transparent conducting material such as indium tin oxide (ITO) or indium zinc oxide (IZO).

In this embodiment, the first electrode E1 and the third electrode E3 are at the same potential. The second electrode E2 is at a potential different from that of the first electrode E1 and the third electrode E3. For example, the common potential is supplied to the first electrode E1 and the third electrode E3. A signal potential is supplied to the second electrode E2. That is, in this embodiment, the first electrode E1 and the third electrode E3 function as the common electrode CE shown in FIG. 1. On the other hand, the second electrode E2 functions as the pixel electrode PE shown in FIG. 1. A fringing field for driving the liquid crystal layer LC is mainly formed by the second electrode E2 and the third electrode E3 which oppose each other via the insulating film 15. The capacitor for holding the signal potential is formed naturally between the second electrode E2 and the third electrode E3 which oppose each other via the insulating film 15, and also between the first electrode E1 and the second electrode E2 which oppose each other via the insulating film 14.

The second substrate SUB2 comprises an insulating substrate 20, a light-shielding layer 21, a color filters 22, an overcoat layer 23 and an alignment film AL2. The light-shielding layer 21 and the color filter layer 22 are formed on a side of the insulating substrate 20, which opposes the first substrate SUB1. The light-shielding layer 21 is formed of a resin colored in, for example, black and to prepare partitioned pixels PX. In the example illustrated, the light-shielding layer 21 opposes the signal line S, the switching element SW, the contact hole CH3, etc. The overcoat layer 23 covers the color filter layer 22. The alignment film AL2 covers the overcoat layer 23.

The first substrate SUB1 and the second substrate SUB2 described above are disposed such that the first alignment film AL1 and the second alignment film AL2 oppose each other. Between the alignment film AL1 and the alignment film AL2, a predetermined cell gap is formed with a spacer which is not illustrated. The cell gap is filled with the liquid crystal layer LC.

Figure 4:
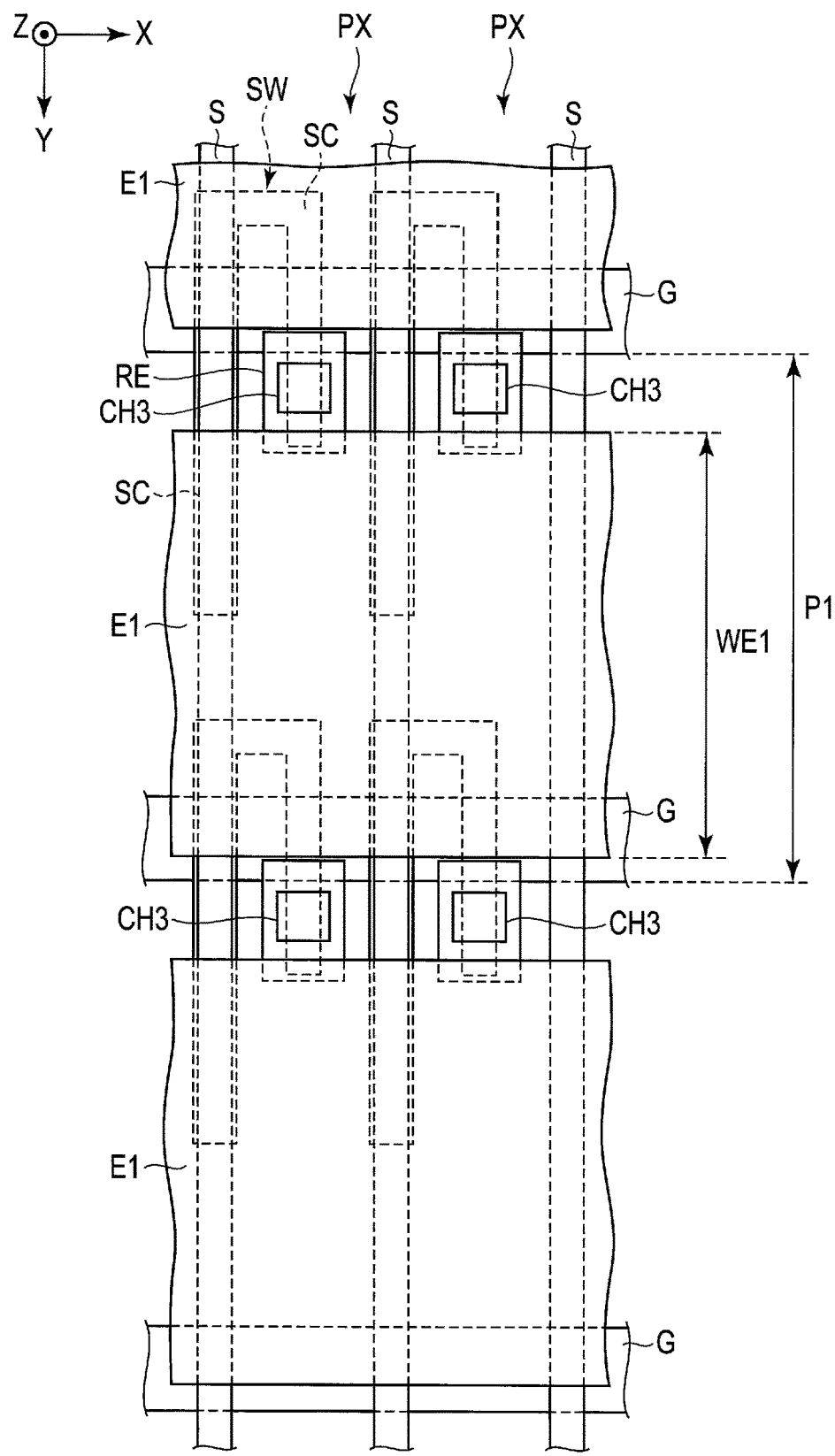
FIG. 4 is a plan view showing a configuration example of a first electrode E1 shown in FIG. 3.

FIG. 4 is a plan view showing a configuration example of first electrodes E1 shown in FIG. 3. Each first electrode E1 overlaps a plurality of pixels PX arranged along the first direction X. More specifically, the first electrodes E1 each extend along the first direction X, and are arranged along the second direction Y at intervals. The first electrodes E1 are each formed into a belt-like shape having substantially a constant width WE1. The width WE1 is less than a pitch P1 between adjacent scanning lines G. Here, the width WE1 and the pitch P1 are each defined along the second direction Y. The first electrode E1 partially overlaps each of the respective scanning line G, the respective signal lines S, the respective semiconductor layers SC, and the respective relay electrodes RE, but does not overlap the contact holes CH3. That is, the contact holes CH3 arranged along the first direction X are located between first electrodes E1 adjacent along the second direction Y.

FIG. 5 is a plan view showing a configuration example of second electrodes E2 shown in FIG. 3. The second electrodes E2 are arranged for the pixels PX, respectively. That is, the second electrodes E2 are arranged in a matrix along the first direction X and the second direction Y. The second electrodes E2 overlap at least the relay electrodes RE and the contact holes CH3, respectively. In the example illustrated, each of the second electrodes E2 has approximately a rectangular shape comprising long sides along the second direction Y, and is formed over the entire region of each pixel PX. The second electrodes E2 each partially overlap the respective scanning lines G, but do not overlap the signal lines S. That is, each second electrode E2 is arranged between the respective adjacent pair of signal lines S.

Figure 6:
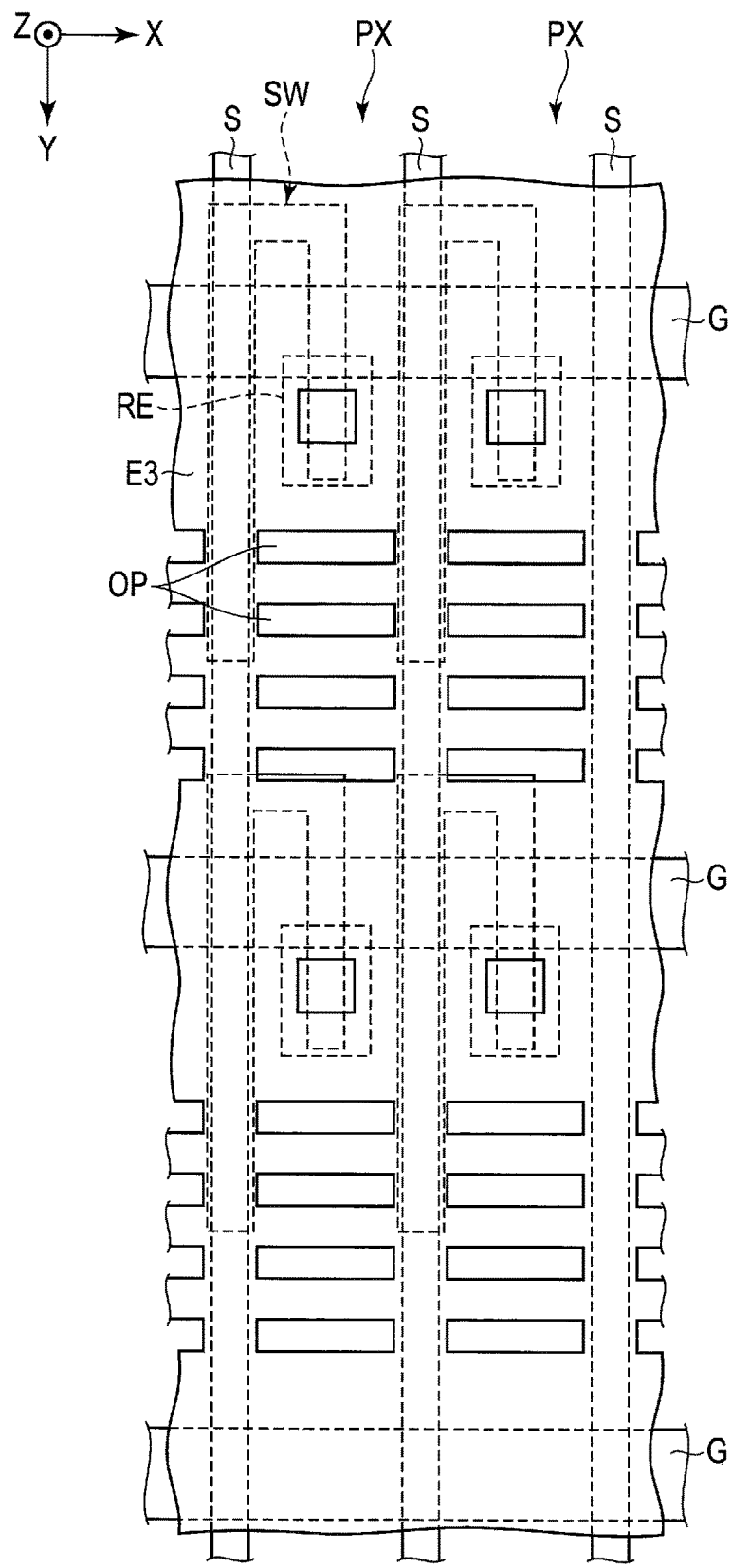
FIG. 6 is a plan view showing a configuration example of a third electrode E3 shown in FIG. 3.

FIG. 6 is a plan view showing a configuration example of third electrode E3 shown in FIG. 3. The third electrode E3 overlaps a plurality of pixels PX arranged along the first direction X and the second direction Y. For example, the third electrode E3 is formed from a single member. The third electrode E3 includes a plurality of openings OP in each pixel PX. These openings OP overlap each respective one of the second electrodes E2 shown in FIG. 5. The openings OP are located between signal lines S adjacent each other and between scanning lines G adjacent each other, and arranged along the second direction Y at intervals. The openings OP do not overlap the relay electrode RE. In the example illustrated, the openings OP each have approximately a rectangular shape comprising long sides along the first direction X. Because of the presence of the openings OP, the area where the third electrode E3 and the second electrodes E2 overlap each other is smaller than the area where the first electrodes E1 and the second electrodes E2 overlap each other.

Figure 7:
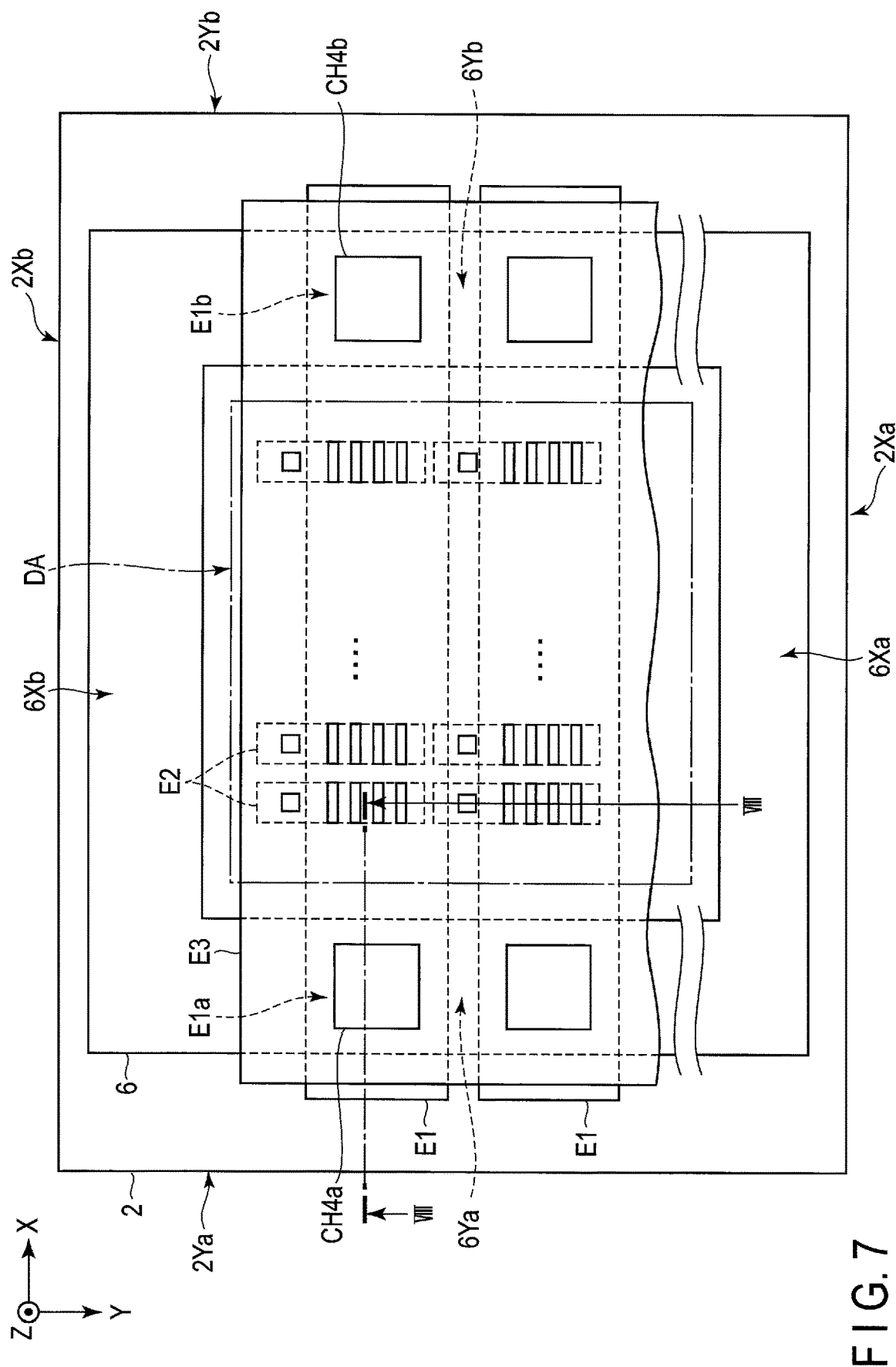
FIG. 7 is a plan view showing an example of arrangement of the first electrode E1, the second electrode E2, and the third electrode E3 with a potential supply line 6 shown in FIG. 1.

FIG. 7 is a plan view showing an example of arrangement of the first electrodes E1, the second electrodes E2, and the third electrode E3 together with the potential supply line 6 shown in FIG. 1. Here, the source driver 3, the gate drivers 4a and 4b, the signal lines S, the scanning lines G and the like are omitted from the illustration.

As described above, the potential supply line 6 is located on an outer side of the display area DA. That is, the potential supply line 6 is closer to the end portions 2Xa, 2Xb, 2Ya and 2Yb of the display panel 2 than the second electrodes E2 which functions as the pixel electrodes PE. In the example illustrated, the potential supply line 6 is patterned into approximately a rectangle along the end portions 2Xa, 2Xb, 2Ya and 2Yb. The potential supply line 6 comprises portions 6Xa and 6Xb extending along the first direction X, and portions 6Ya and 6Yb extending along the second direction Y. The second electrodes E2 are located on an inner side of the region surrounded by the potential supply line 6, and do not overlap the potential supply line 6.

The first electrodes E1 each extend along the first direction X, and include an end portion (second end portion) E1a and an end portion (third end portion) E1b on an opposite side to the end portion E1a. The end portion E1a overlaps the portion 6Ya of the potential supply line 6. The end portion E1b overlaps the portion 6Yb of the potential supply line 6. The third electrode E3 is provided over substantially the entire display area DA and overlaps at least the portions 6Ya and 6Yb. The first electrodes E1 and the third electrode E3 is connected to the potential supply line 6 in a contact hole (first through-hole) CH4a provided in a position which overlaps the end portion E1a and a contact hole (second through-hole) CH4b provided in a position which overlaps the end portion E1b. Thus, a common potential is supplied to the first electrodes E1 and the third electrode E3 from the potential supply line 6.

In this embodiment, the contact holes CH4a and CH4b are not provided in the display area DA. Therefore, along the first direction X, all the second electrodes E2 are located between the contact hole CH4a and the contact hole CH4b.

Figure 8:
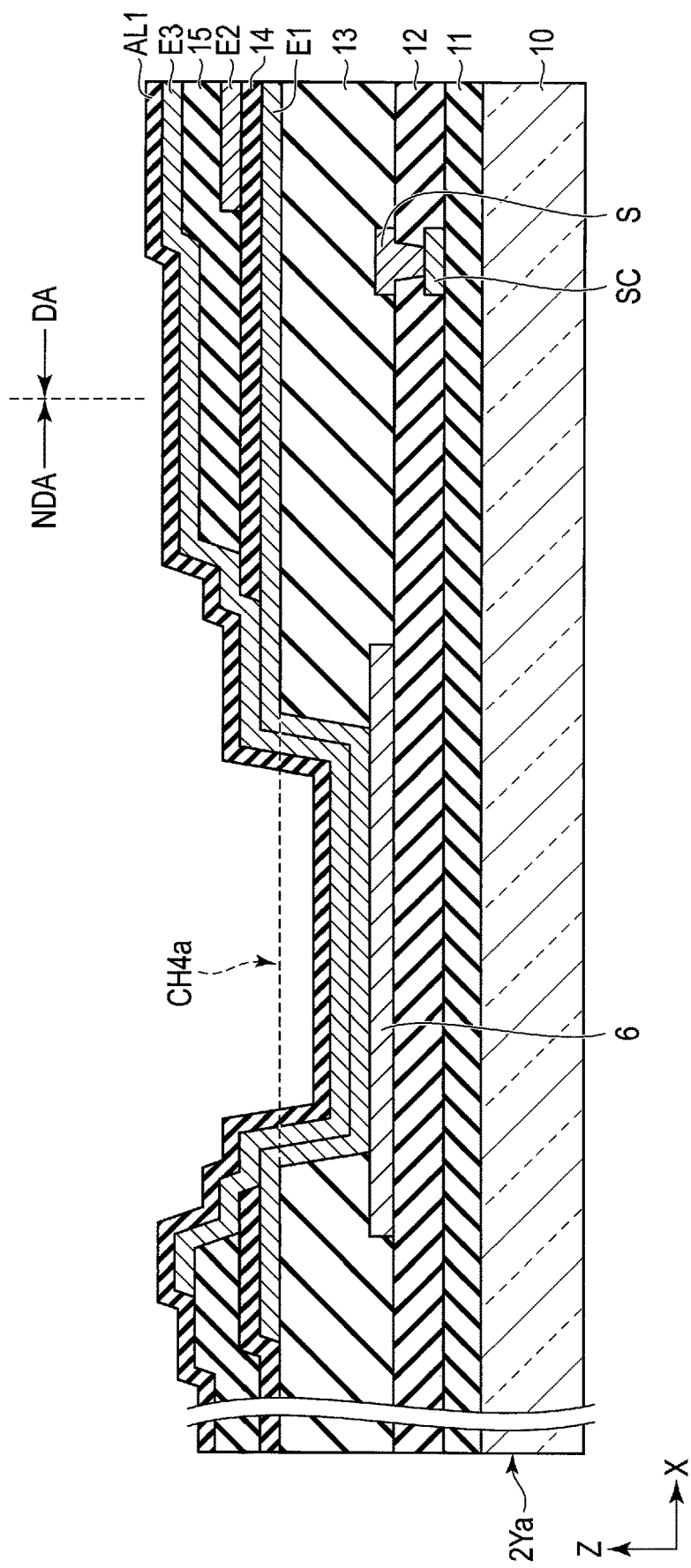
FIG. 8 is a cross section taken along line VIII-VIII shown in FIG. 7.

FIG. 8 is a cross section taken along line VIII-VIII shown in FIG. 7. Here, only the first substrate SUB1 is shown. The end portion (first end portion) 2Ya of the display panel 2, described above, is equivalent to an end portion of the insulating substrate 10 included in the first substrate SUB1. The potential supply line 6 is formed on the insulating film 12 and covered by the insulating film 13 in the non-display area NDA. The insulating film 13 includes the contact hole CH4a which penetrates to the potential supply line 6.

The first electrode E1 extends along the first direction X and is formed in the contact hole CH4a. The first electrode E1 is in contact with the potential supply line 6 within the contact hole CH4a. The insulating film 14 and the insulating film 15 are not formed in the vicinity of the contact hole CH4a. The third electrode E3 extends along the first direction X, and is in contact with the first electrode E1 in the contact hole CH4a. Thus, the first electrode E1 and the third electrode E3 are at the same potential as that of the potential supply line 6. Note that the structure in the vicinity of the contact hole CH4b is similar to that shown in FIG. 8, an explanation thereof will be omitted.

According to this embodiment, the first electrodes E1, the second electrodes E2, and the third electrode E3 are stacked on one another in this order. The common potential is supplied to the first electrodes E1 and the third electrode E3, and the signal potential is supplied to the second electrodes E2. The third electrode E3 comprises a plurality of openings OP, and forms a fringing field for driving the liquid crystal layer LC between the second electrodes E2 and themselves, respectively. On the other hand, the second electrodes E2 do not have openings, and each are formed over substantially the entire pixels PX, respectively. Further, the first electrodes E1 are formed over the entire display area DA except for the vicinities of the contact holes CH3. With this structure, even if a sufficient capacitor is not formed between the second electrodes E2 and the third electrode E3 due to the insufficiently small overlapping area between the second electrodes E2 and the third electrode E3, a sufficient storage capacitor for holding the signal potential between the first electrodes E1 and the second electrodes E2 can be formed.

Furthermore, according to this embodiment, the thickness T15 of the insulating film 15 provided between the second electrodes E2 and the third electrode E3 is greater than the thickness T14 of the insulating film 14 provided between the first electrodes E1 and the second electrodes E2. Therefore, the capacitor formed between the second electrodes E2 and the third electrode E3 is less than the capacitor formed between the first electrodes E1 and the second electrodes E2. With this configuration, even if the size of the openings of the third electrode E3 varies, in other words, if the overlapping area between the third electrode E3 and the second electrodes E2 vary from one pixel PX to another, the adverse effect caused by the dispersion in the capacitance formed between the third electrode E3 and the second electrodes E2 can be reduced. On the other hand, since the thickness T14 of the insulating film 14 is decreased, a sufficient capacitance can be formed between the first electrodes E1 and the second electrodes E2.

Moreover, the coverage in the vicinities of the contact holes CH3 can be improved by increasing the thickness T15 of the insulating film 15. That is, with the increased thickness T15 of the insulating film 15, the insulation between the second electrodes E2 and the third electrode E3 in the contact holes CH3 can be improved. Further, with the insulating film 15 as such, discharge of the gas from the insulating film 13 formed of an organic insulating material can be suppressed.

Furthermore, according to this embodiment, the first electrodes E1 and the third electrode E3 are connected to the potential supply line 6 on the outer side of the display area DA. In other words, the contact holes CH4a and CH4b for connecting the first electrodes E1 and the third electrode E3 to the potential supply line 6 are not provided in the display area DA. With this structure, the common potential can be supplied to the first electrodes E1 and the third electrode E3 without reducing the aperture ratio of the display area DA.

As described above, according to this embodiment, a display device with a high definition can be obtained while maintaining display quality.

Figure 9:
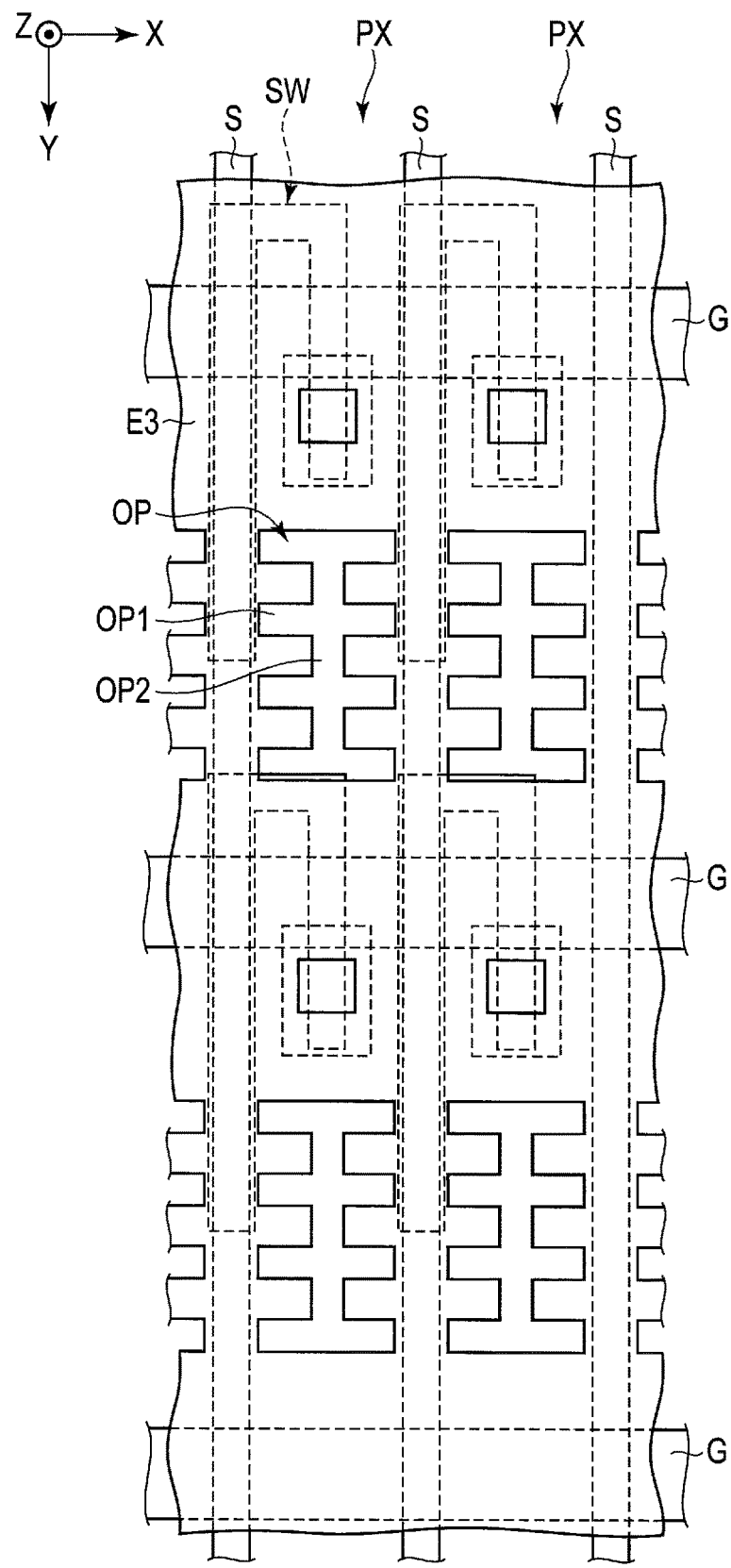
FIG. 9 is a plan view of a first modified example of the first embodiment.

Modified examples of the first embodiment will be described with reference to FIGS. 9 to 14. FIG. 9 is a plan view showing a first modified example of the first embodiment. The first modified example is different from the example shown in FIG. 6 in that the third electrode E3 includes one opening OP in each pixel PX. The opening OP includes a portion OP1 extending along the first direction X and a portion OP2 extending along the second direction Y. The disposition of the portion OP1 is similar to that of the opening OP shown in FIG. 6. The portion OP2 connects a plurality of portions OP1 arranged along the second direction Y.

In the first modified example as well, the second electrodes E2 to which the signal potential is supplied are formed between the first electrodes E1 and the third electrode E3, to which the common potential is supplied, and the thickness T15 of the insulating film 15 is greater than the thickness of the insulating film 14. Moreover, the first electrode E1 and the third electrode E3 are connected to the potential supply line 6 in the non-display area NDA. In the first modified example, advantages effect similar to those of the example shown in FIGS. 1 to 8 can be obtained.

FIG. 10 is a plan view showing a second modified example of the first embodiment. The second modified example is different from the example shown in FIG. 6 in that the openings OP of the third electrode E3 extend along a direction where the first direction X and the second direction Y cross each other. For example, the openings OP are each formed into approximately a parallelogram and are arranged along the second direction Y. In the example illustrated, in each pair of pixels PX adjacent to each other in the first direction X, the extending directions of the openings OP are the same as each other. On the other hand, in each pair of pixels PX adjacent to each other in the second direction Y, the extending directions of the openings OP are different from each other. In the second modified example, advantages effect similar to those of the examples shown in FIGS. 1 to 8 can be obtained.

Figure 11:
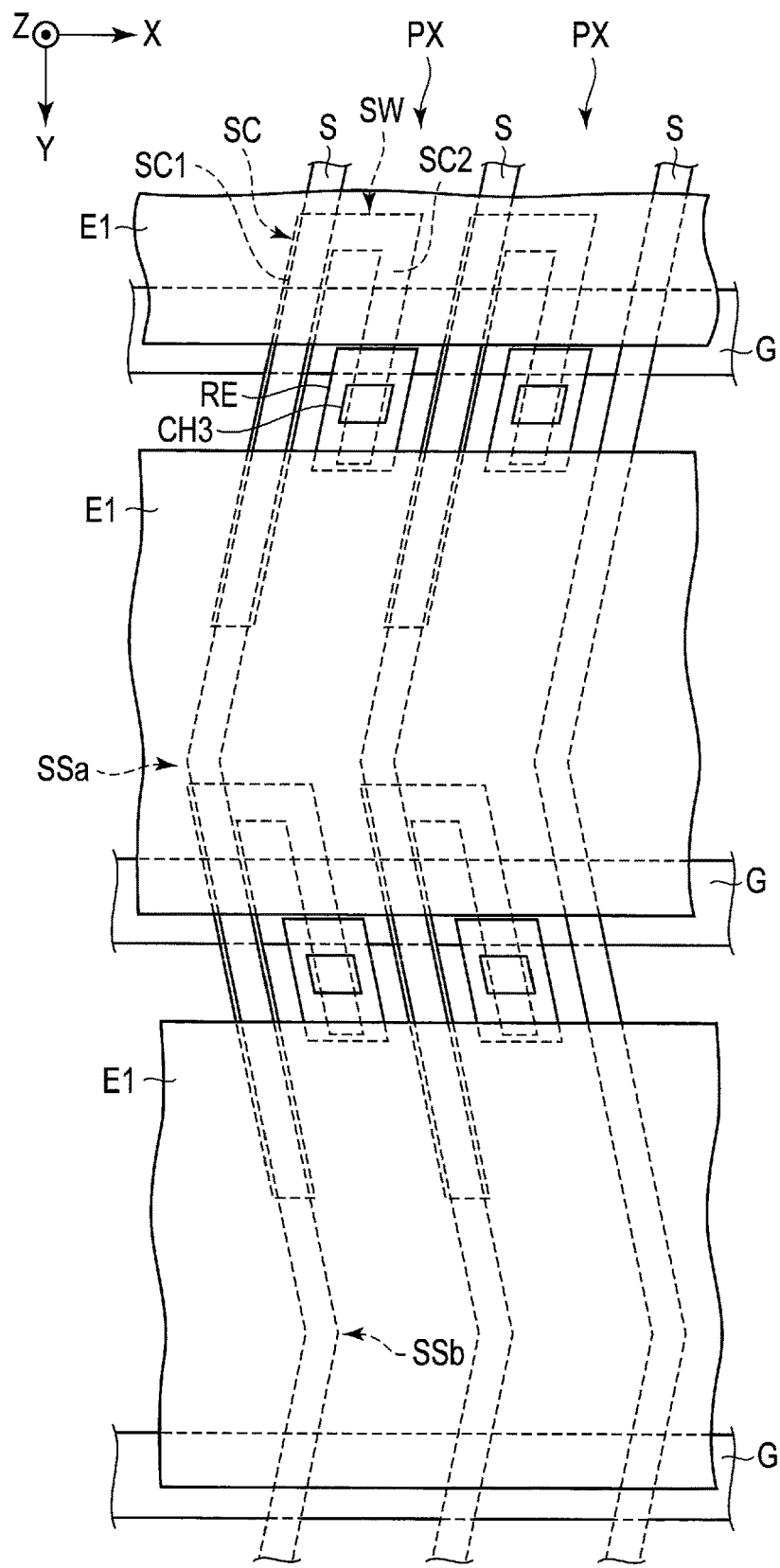
FIG. 11 is a plan view of a third modified example of the first embodiment.

FIG. 11 is a plan view showing a third modified example of the first embodiment. The third modified example is different from the example shown in FIG. 4 in that the signal lines S are crooked. The signal lines S each include bent portions SSa protruding in a direction opposite to the first direction X and bent portions SSb protruding in the first direction X. The bent portions SSa and the bent portions SSb are arranged alternately along the second direction Y. Of the semiconductor layer SC which constitutes the switching element SW, the first portion SC1 and the second portion SC2 extend along the respective signal lines S. For example, the relay electrodes RE each have a parallelogram shape.

In the third modified example, the first electrodes E1 are of a similar shape as that of the example shown in FIG. 4. That is, the first electrodes E1 extend along the first direction X, and are arranged along the second direction Y. The contact holes CH3 are located between the first electrodes E1 adjacent to each other in the second direction Y.

FIG. 12 is a plan view showing second electrodes E2 of a third modified example of the first embodiment. The second electrodes E2 of the third modified example embodiment are different from those of the example shown in FIG. 6 in that they are formed into a parallelogram shape. The second electrodes E2 extend along the respective signal lines S. In each respective pair of pixels PX adjacent to each other in the first direction X, the extending directions of the second electrodes E2 are the same as each other. On the other hand, in each respective pair of pixels PX adjacent to each other in the second direction Y, the extending directions of the second electrodes E2 are different from each other.

FIG. 13 is a plan view showing third electrode E3 of the third modified example of the first embodiment. The third electrode E3 of the third modified example embodiment are different from those of the example shown in FIG. 6 in that they include openings extending along the respective signal lines S. For example, the openings OP each have a parallelogram shape. The openings OP overlap respectively the second electrodes E2 shown in FIG. 12. In each respective pair of pixels PX adjacent to each other in the first direction X, the extending directions of the openings OP are the same as each other. On the other hand, in each respective pair of pixels PX adjacent to each other in the second direction Y, the extending directions of the openings OP are different from each other. In the example illustrated, the third electrode E3 includes one opening OP in each pixel PX, but they may include two or more openings. In the third modified example, advantages effect similar to those of the examples shown in FIGS. 1 to 8 can be obtained.

Figure 14:
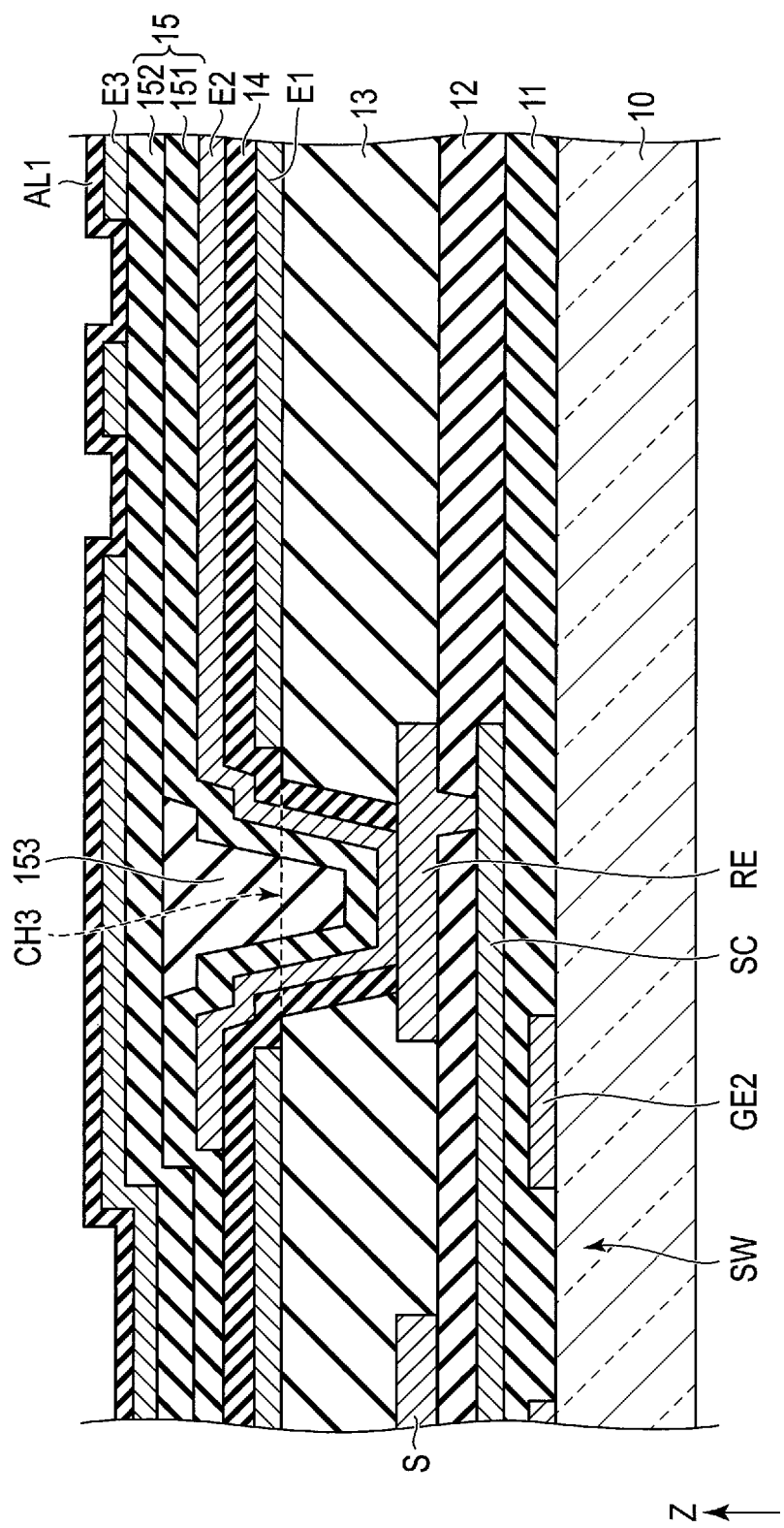
FIG. 14 is a cross section of a fourth modified example of the first embodiment.

FIG. 14 is a cross section showing a fourth modified example of the first embodiment. FIG. 14 is an enlarged view of the vicinities of the contact holes CH3. The fourth modified example is different from the example shown in FIG. 3 in that the insulating film 15 includes a first layer 151 and a second layer 152.

The first layer 151 covers the second electrodes E2 and is formed also on the insulating film 14. The second layer 152 is formed on the first layer 151. Further, in the example illustrated, the insulating film 15 includes a third layer 153 located between the first layer 151 and the second layer 152. The third layer 153 is formed directly above the contact holes CH3 to bury the concavities formed by the contact holes CH3.

For example, the first and second insulating films 151 and 152 are each formed from, an inorganic insulating material such as silicon oxide, silicon nitride or silicon oxynitride. The third layer 153 is formed from, for example, an organic insulating material such as polyimide.

In the fourth modified example, advantages effect similar to those of the examples shown in FIGS. 1 to 8 can be obtained. Further, according to the fourth modified example, the concavities formed by the contact holes CH3 are buried by the third layer 153. Therefore, the uneven portion created in the vicinities of the second electrodes E2 due to the formation of the contact holes CH3 can be smoothed.

Second Embodiment

Figure 15:
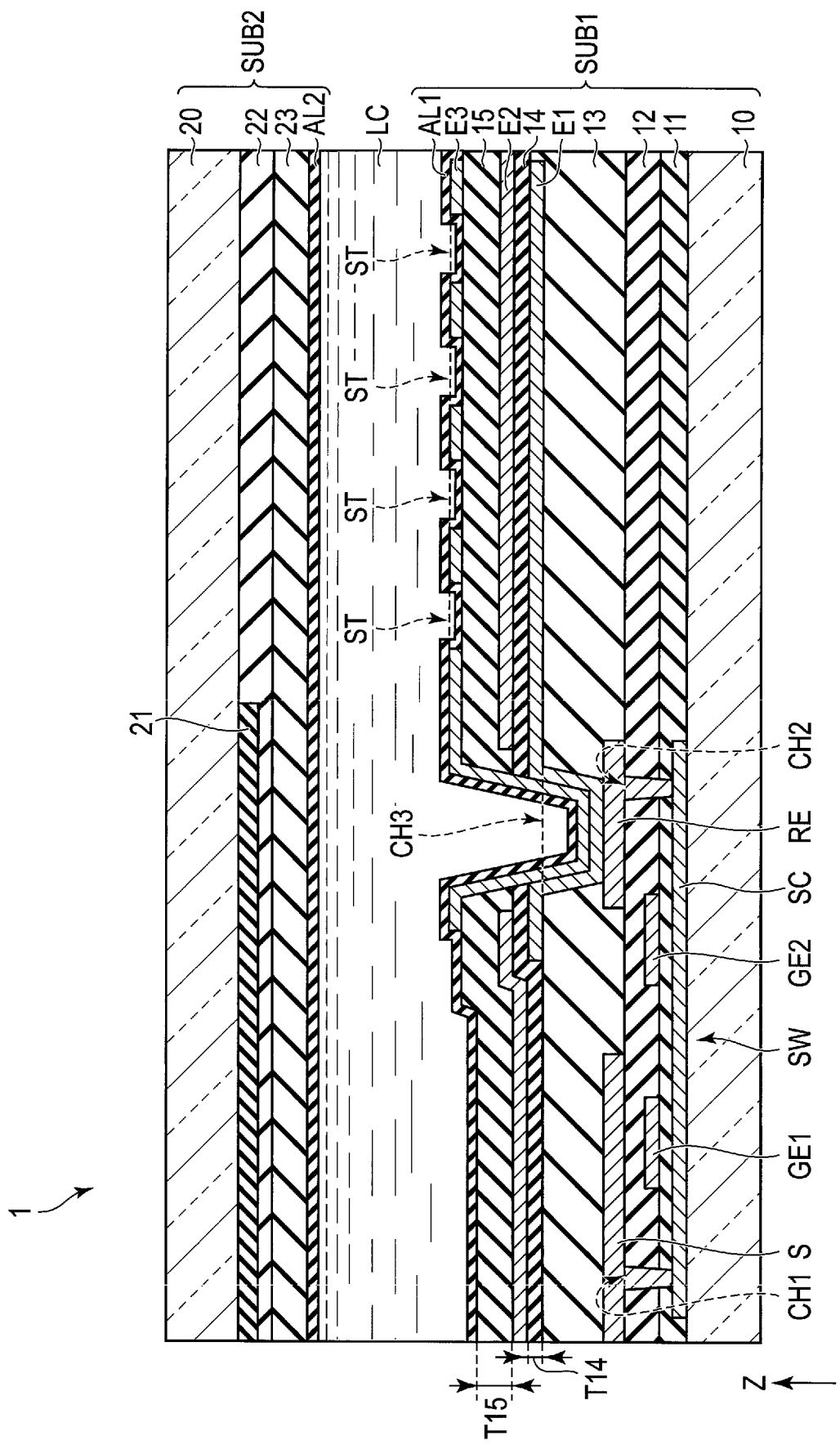
FIG. 15 is a cross section of a display device according to the second embodiment.

FIG. 15 is a cross section of a display device 1 according to the second embodiment. The second embodiment is different from first embodiment in that the signal potential is supplied to the first electrodes E1 and the third electrode E3, and the common potential is supplied to the second electrodes E2. That is, the first electrodes E1 and the third electrode E3 function as the pixel electrodes PE shown in FIG. 1. The second electrodes E2 function as the common electrodes CE shown in FIG. 1.

In the example illustrated, the switching elements SW are each a top-gate thin film transistor. The semiconductor layer SC is formed on the insulating substrate 10, and is covered by the insulating film 11. The gate electrodes GE1 and GE2 are provided on the insulating film 11 and are covered by the insulating film 12. The signal lines S and the relay electrodes RE are formed on the insulating film 12, and are covered by the insulating film 13. The signal lines S and the insulating film 12 are each in contact with the semiconductor layer SC in the contact holes CH1 and CH2 which penetrate the insulating films 11 and 12.

The insulating film 13 includes a contact hole CH3 which penetrates to the relay electrode RE. The first electrodes E1 are formed on the insulating film 13 and are provided also in the contact holes CH3 so as to be contact with the relay electrodes RE. The insulating film 14 covers the first electrodes E1 except for the regions directly above the contact holes CH3. In other words, the insulating film 14 uncovers the first electrodes E1 formed in the contact holes CH3. In the illustrated example, the insulating film 14 is formed on the insulating film 13.

The second electrodes E2 are formed on the insulating film 14 except for the vicinities of the contact holes CH3. The insulating film 15 covers the second electrodes E2. The insulating film 15 covers the end portion of the second electrode E2, but it is not formed in the contact holes CH3. In other words, as in the case of the insulating film 14, the insulating film 15 uncovers the first electrodes E1 formed in the contact holes CH3. The third electrode E3 is formed on the insulating film 15. The third electrode E3 extends into the contact holes CH3 to be brought into contact with the first electrodes E1. Thus, the signal potential supplied from the signal line S is supplied to the first electrode E1 and the third electrode E3 via the relay electrodes RE. In the example illustrated, the third electrode E3 includes a plurality of slits SL. The slits ST each oppose the second electrodes E2, respectively. The third electrode E3 is covered by the alignment film AL1.

The fringing field for driving the liquid crystal layer LC in this embodiment is mainly formed by the second electrode E2 and the third electrode E3 opposing each other via the insulating film 15. On the other hand, the capacitor for holding the signal potential is formed, naturally, by the second electrode E2 and the third electrode E3 opposing each other via the insulating film 15, and also by the first electrode E1 and the second electrode E2 opposing each other via the insulating film 14. In this embodiment as well, the thickness T15 of the insulating film 15 is greater than the thickness T14 of the insulating film 14. The other structure is similar to that of the first embodiment, and therefore an explanation therefor will be omitted.

FIG. 16 is a plan view showing a configuration example of first electrodes E1 shown in FIG. 15. The first electrodes E1 are disposed for the respective pixels PX. That is, the first electrodes E1 are arranged in a matrix in the first direction X and the second direction Y. The first electrodes E1 overlap at least the relay electrodes RE and the contact holes CH3, respectively. In the example illustrated, the first electrodes E1 each have approximately a rectangular shape with long sides along the second direction Y and are formed over the entire respective pixels PX. The first electrodes E1 overlap the respective scanning lines G partially, but do not overlap the signal lines S. In other words, the first electrodes E1 are disposed between the signal lines S adjacent to each other.

FIG. 17 is a plan view showing a configuration example of second electrodes E2 shown in FIG. 15. The second electrodes E2 each overlap a plurality of pixels PX arranged along the first direction X. More specifically, the second electrodes E2 each extend along the first direction X, and are arranged along the second direction Y at intervals. The second electrodes E2 are each formed into a belt-like shape having substantially a constant width WE2. The width WE2 is less than the pitch P1 between the scanning lines G adjacent to each other. Here, the width WE2 and the pitch P1 are each defined along the second direction Y. The second electrodes E2 partially overlap the scanning lines G, the signal lines S, the semiconductor layer SC and the relay electrodes RE, respectively, but do not overlap the contact holes CH3. In other words, the contact holes CH3 arranged along the first direction X are located between the second electrodes E2 adjacent to each other in the second direction Y.

FIG. 18 is a plan view showing a configuration example of third electrodes E3 shown in FIG. 15. The third electrodes E3 are disposed in the pixels PX, respectively. The third electrodes E3 are arranged in a matrix along the first direction X and the second direction Y.

The third electrodes E3 each include a contact portion E31, a connection portion E32, and electrode portions E33. The contact portion E31 overlaps all of the relay electrodes RE and the contact holes CH3. The contact portion E31 is connected to the respective relay electrode RE via the respective first electrode E1 in the respective contact hole CH3. The connection portion E32 is located immediately above the respective signal line S via the respective second electrode E2, and extends along the second direction Y from the contact portion E31. The electrode portions E33 each extend from the connection portion E32 along the first direction X. The electrode portions E33 overlap the second electrode E2 shown in FIG. 17. The electrode portions E33 are each formed into a belt-like shape having substantially a constant width W33 and arranged along the second direction Y at intervals. In the example illustrated, the third electrode E3 includes four electrode portions E33, but the number of electrode portions E33 is not limited to this. The slits ST shown in FIG. 15 are each equivalent to the region between the electrode portions E33 adjacent to each other. The third electrodes E3 each include the slits ST, and therefore the area where the third electrode E3 and the second electrode E2 overlap each other is less than the area where the first electrodes E1 and the second electrodes E2 overlap each other. Note that such a structure may as well be adopted that the connection portion E32 of each third electrode E3 is provided between signal lines S adjacent to each other in plan view.

Figure 19:
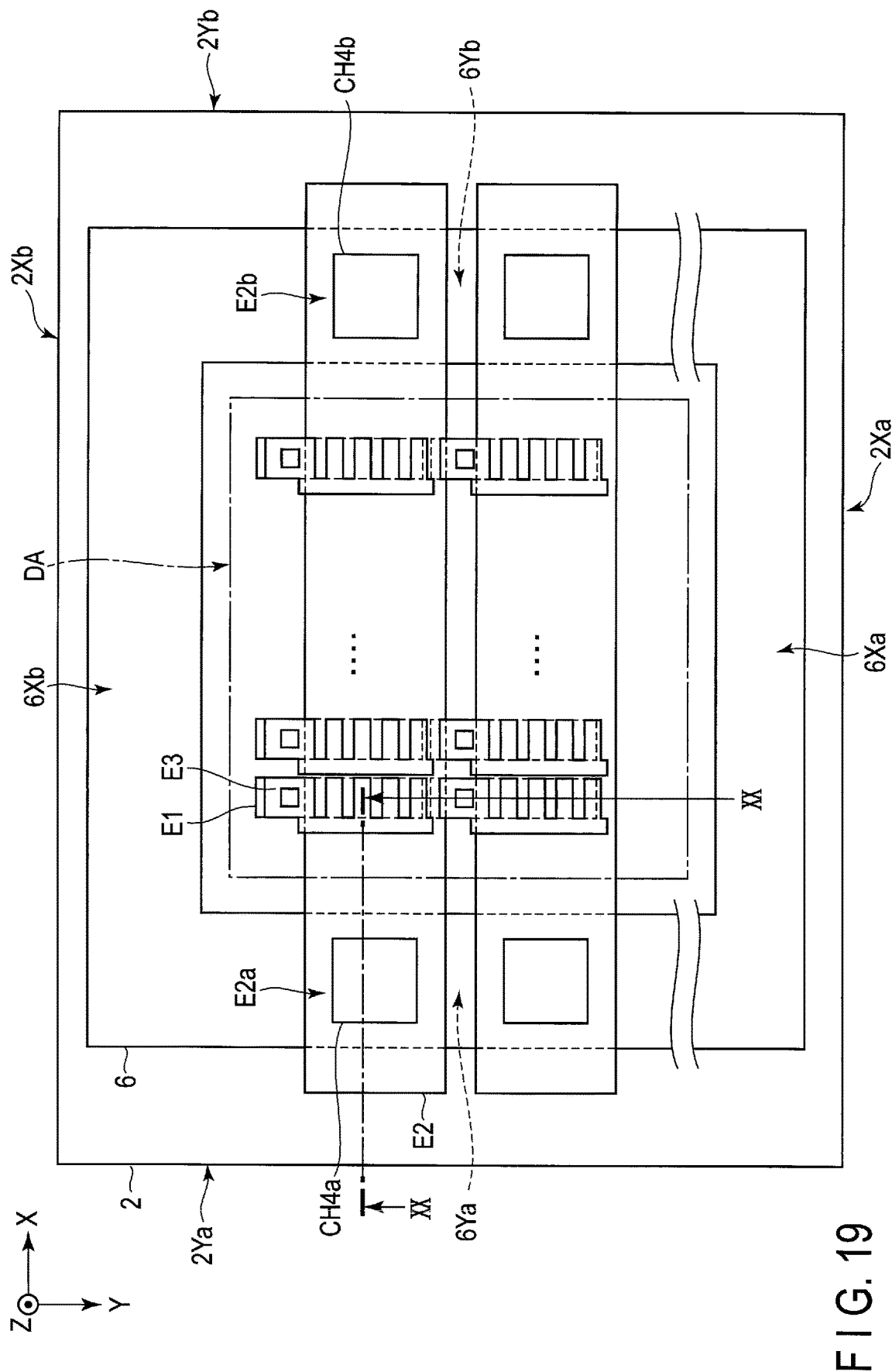
FIG. 19 is a plan view showing an example of arrangement of the first electrode E1, the second electrode E2, and the third electrode E3 with a potential supply line 6 shown in FIG. 1.

FIG. 19 is a plan view showing an example of arrangement of the first electrodes E1, the second electrodes E2, and the third electrodes E3 with the potential supply line 6 shown in FIG. 1. Here, the source driver 3, the gate drivers 4a and 4b, the signal lines S, the scanning lines G and the like are omitted from illustration.

As in the case of the first embodiment, the potential supply line 6 is located on an outer side of the display area DA. The potential supply line 6 is closer to the end portions 2Xa, 2Xb, 2Ya and 2Yb of the display panel 2 than the first electrode E1 and the third electrode E3, which function as pixel electrodes PE. The potential supply line 6 is patterned into approximately a rectangle and comprises portions 6Xa and 6Xb extending along the first direction X, and portions 6Ya and 6Yb extending along the second direction Y. The first electrode E1 and the third electrode E3 are located on an inner side of the region surrounded by the potential supply line 6, and do not overlap the potential supply line 6.

The second electrodes E2 each extend along the first direction X, and include an end portion (fourth end portion) E2a and an end portion (fifth end portion) E2b on an opposite side to the end portion E2a. The end portion E2a overlaps the portion 6Ya of the potential supply line 6. The end portion E2b overlaps the portion 6Yb of the potential supply line 6. The second electrodes E2 are connected to the potential supply line 6 in contact holes CH4a and CH4b provided in the positions which overlap the end portions E2a and the end portion E2b, respectively. Thus, the common potential is supplied to the second electrodes E2 from the potential supply line 6.

The contact holes CH4a and CH4b are not provided in the display area DA. Therefore, along the first direction X, all of the first electrodes E1 and the third electrodes E3 are located between the contact hole CH4a and the contact hole CH4b.

Figure 20:
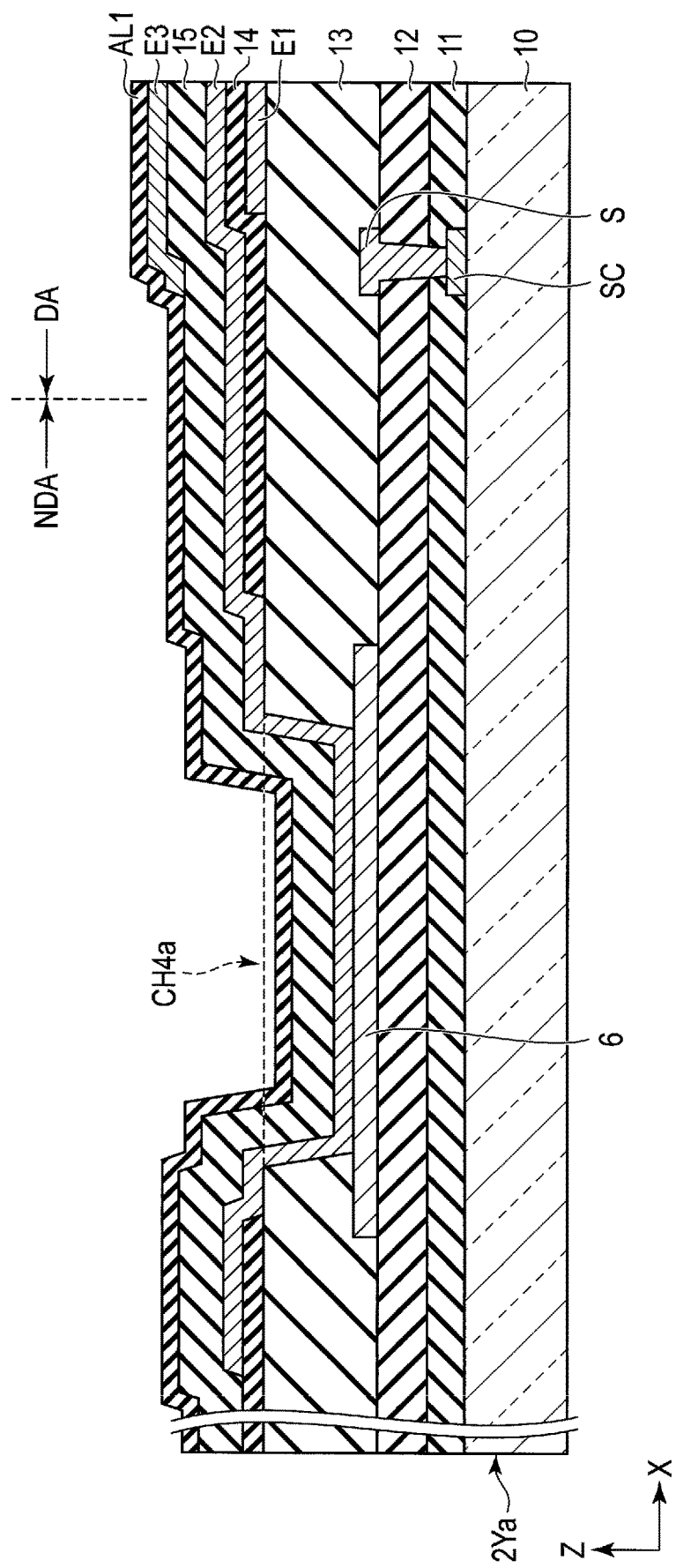
FIG. 20 is a cross section taken along line XX-XX shown in FIG. 19.

FIG. 20 is a cross section taken along the line XX-XX shown in FIG. 19. Here, only the first substrate SUB1 is shown. The potential supply line 6 is formed on the insulating film 12 in the non-display area NDA, and is covered by the insulating film 13. The insulating film 13 includes the contact hole CH4a which penetrates to the potential supply line 6. The insulating film 14 covers the first electrodes E1 and is formed also on the insulating layer 13. In the example illustrated, the insulating film 14 extends to the non-display area NDA, but it is not formed in the contact hole CH4a.

The second electrodes E2 are formed on the insulating film 14 and the insulating film 13. The second electrodes E2 each extend along the first direction X, and are formed also in the respective contact holes CH4a. The second electrodes E2 are brought into contact with the potential supply line 6 in the respective contact holes CH4a. Thus, the second electrodes E2 and the potential supply line 6 are at the same potential. The insulating film 15 extends to the non-display area NDA, and covers the second electrodes E2. The third electrodes E3 are formed on the insulating film 15 and also immediately above the first electrodes E1, respectively. Note that the structure in the vicinity of each contact hole CH4b is similar to that of FIG. 20, an explanation thereof is omitted.

According to this embodiment, the first electrode E1, the second electrode E2, and the third electrode E3 are stacked in this order. The signal potential is supplied to the first electrodes E1 and the third electrodes E3, and the common potential is supplied to the second electrodes E2. The third electrodes E3 each include a plurality of electrode portions E33, and form a fringing field for driving the liquid crystal layer LC between the second electrodes E2 and the electrode portions themselves, respectively. On the other hand, the second electrodes E2 are formed over the entire display area DA except for the vicinities of the contact holes CH3. Moreover, the first electrodes E1 are formed over substantially the entire pixels PX, respectively. Thus, even if the area of the region where the second electrodes E2 and the third electrodes E3 overlap each other is small and a sufficient capacitor is not formed between the second electrodes E2 and the third electrodes E3 is not formed, a sufficient storage capacitance for holding the signal potential can be formed between the first electrodes E1 and the second electrodes E2. As a result, degradation of the holding state of the pixel signal in each pixel can be suppressed.

Moreover, as in the first embodiment, according to this embodiment, the thickness T15 of the insulating film 15 is greater than the thickness T14 of the insulating film 14. Therefore, the capacitor formed between the second electrodes E2 and the third electrodes E3 is smaller than the capacitor formed between the first electrodes E1 and the second electrodes E2. Thus, even if the width W33 of the electrode portion E33 of the third electrode E3 varies, the adverse effect due to the variation in the capacitor formed by the third electrodes E3 and the second electrodes E2 in the respective pixels PX can be suppressed. On the other hand, with the reduced thickness T14 of the insulating film 14, a sufficient capacity can be formed between the first electrodes E1 and the second electrodes E2. Moreover, with the increased thickness T15 of the insulating film 15, the coverage in the vicinities of the contact holes CH3 can be improved.

Further, according to this embodiment, the second electrodes E2 are connected to the potential supply line 6 on an outer side of the display area DA. In other words, the contact holes CH4a and CH4b for connecting the second electrodes E2 and the potential supply line 6 to each other are not provided in the display area DA. With this structure, the common potential can be supplied to the second electrode E2 without reducing the aperture ratio of the display area DA.

As described above, according to this embodiment, a display device with a high definition can be obtained while maintaining display quality.

Figure 21:
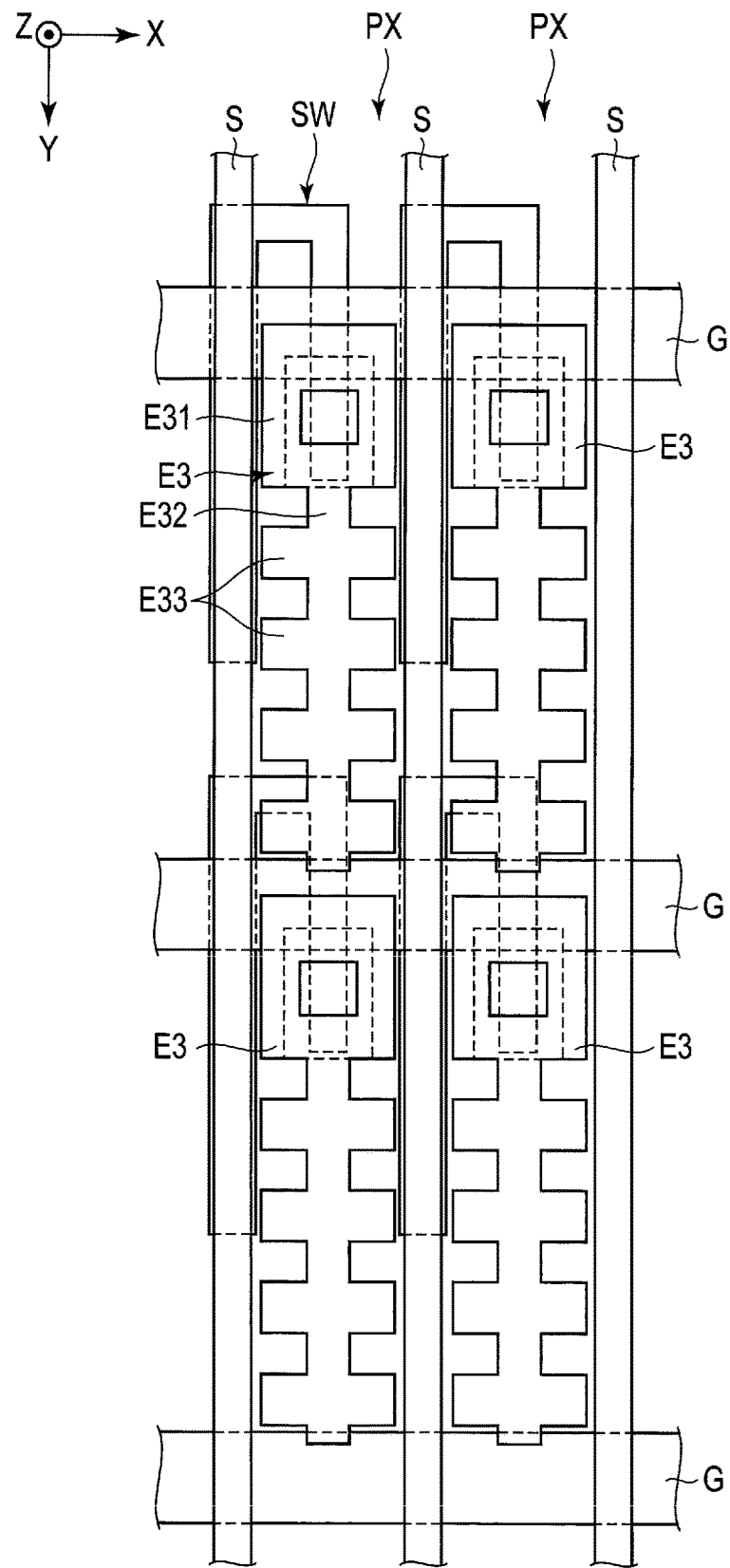
FIG. 21 is a plan view of a first modified example of the second embodiment.

Modified examples of the second embodiment will be described with reference to FIGS. 21 to 25. FIG. 21 is a plan view showing a first modified example of the second embodiment. The first modified example is different from the example shown in FIG. 18 in that the connection portion E32 of each third electrode E3 does not overlap the signal lines S. In the example illustrated, the connection portions E32 are located in approximately a central portion between the signal lines S adjacent to each other.

In the first modified example as well, the second electrode E2 to which the common potential is supplied is formed between the first electrodes E1 and the third electrode E3, to which the signal potential is supplied, and the thickness T15 of the insulating film 15 is greater than the thickness of the insulating film 14. Moreover, the second electrodes E2 are connected to the potential supply line 6 in the non-display area NDA. Thus, in the first modified example, advantages effect similar to those of the examples shown in FIGS. 15 to 20 can be obtained.

FIG. 22 is a plan view showing a second modified example of the second embodiment. The second modified example is different from the example shown in FIG. 18 in that the electrode portions E33 each extend along a direction crossing the first direction X and the second direction Y. In the example illustrated, the extending directions of the electrode portions E33 are the same between pixels PX adjacent to each other in the first direction X. On the other hand, in pixels PX adjacent to each other in the second direction Y, the extending directions of the electrode portions E33 are different from each other. In the second modified example as well, advantages effect similar to those of the examples shown in FIGS. 15 to 20 can be obtained.

Figure 23:
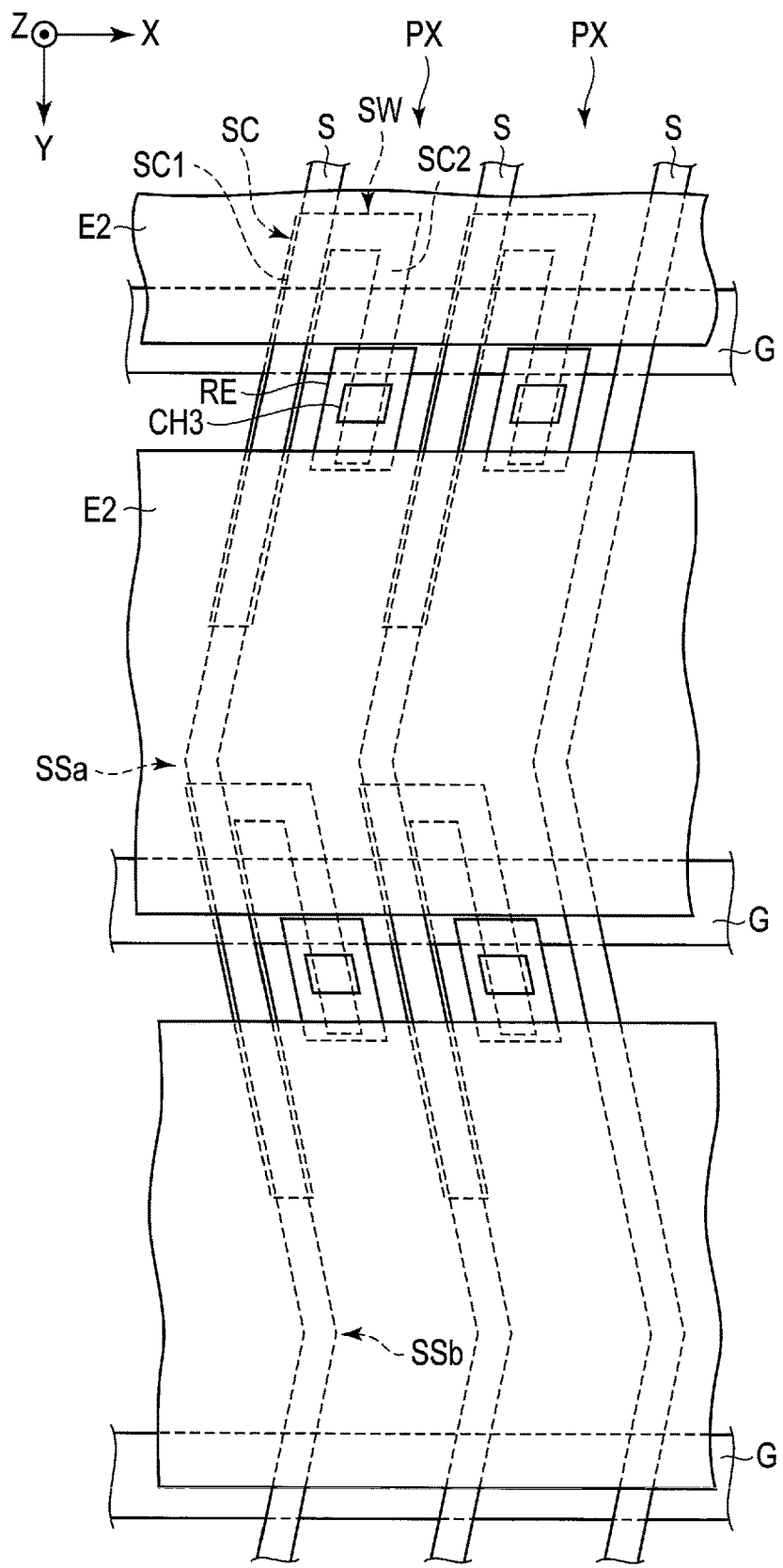
FIG. 23 is a plan view of a third modified example of the second embodiment.

FIG. 23 is a plan view showing a third modified example of the second embodiment. The third modified example is different from the example shown in FIG. 17 in that the signal lines S are crooked. The signal lines S each include bent portions SSa projecting in a direction opposite to the first direction X, and bent portions SSb projecting in the first direction X. The bent portions SSa and the bent portions SSb are arranged alternately along the second direction Y. Of the semiconductor layer SC which constitutes the switching element SW, the first portion SC1 and the second portion SC2 extend along the signal lines S, respectively. For example, the relay electrodes RE are each formed into a parallelogram shape.

In the third modified example, the second electrodes E2 have a shape similar to that shown in the example shown in FIG. 17. That is, the second electrodes E2 each extend along the first direction X, and are arranged along the second direction Y. The contact holes CH3 are each located between the second electrodes E2 adjacent to each other in the second direction Y.

FIG. 24 is a plan view showing first electrodes E1 in a third modified example of the second embodiment. The first electrodes E1 in the third modified example are different from those of the example shown in FIG. 16 in that they are parallelograms. The first electrodes E1 each extend along the respective signal lines S. In pixels PX adjacent to each other in the first direction X, the extending directions of the first electrodes E1 are the same. On the other hand, in pixels PX adjacent to each other in the second direction Y, the extending directions of the first electrode E1 are different from each other.

FIG. 25 is a plan view showing third electrodes E3 in a third modified example of the second embodiment. The third electrodes E3 in the third modified example are different from shoe of the example shown in FIG. 18 in that they include electrode portions E33 extending along the signal lines S. The third electrodes E3 do not include a connection portion E32, but the electrode portions E33 each extend from the respective contact portions E31. The electrode portions E33 each overlap the respective second electrodes E2 shown in FIG. 23. In pixels PX adjacent to each other in the first direction X, the extending directions of electrode portions E33 are the same. On the other hand, in pixels PX adjacent to each other in the second direction Y, the extending directions of electrode portions E33 are different from each other. In the example illustrated, the third electrodes E3 include one electrode portion E33, but they may include two or more electrode portions E33. In the third modified example, advantages effect similar to those of the examples shown in FIGS. 15 to 20 can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. For example, in the embodiments described above, the structure in which a liquid crystal layer is used as a display element is adopted, but it is also possible to adopt such a structure which uses a material with some other optical properties, such as an electrophoretic layer in place of a liquid crystal layer. The accompanying claims and their equivalents are intended to cover such forms or modifications as would fall within the scope and spirit of the inventions.

What is claimed is:
1. A display device comprising:
a substrate;
a switching element provided on the substrate and including a relay electrode;
a first lower electrode provided further away from the substrate than the switching element, the first lower electrode having an outer edge;
a first insulating film provided on the first lower electrode;
a first middle electrode provided on the first insulating film, the first middle electrode connected to the relay electrode through a through hole of the first insulating film;
a second insulating film provided on the first middle electrode; and
a first upper electrode provided on the second insulating film and supplied with a same potential as that of the first lower electrode, the first upper electrode including a plurality of openings,
wherein
the first middle electrode functions as a pixel electrode,
the first lower electrode and the first upper electrode sandwich the first middle electrode and function as a common electrode,
the through hole is provided outside the outer edge of the first lower electrode,
an entirety of the thorough hole is covered with the second insulating film and the first upper electrode, and the second insulating film includes a filler disposed to fill in the through hole, and a first layer covering the through hole and the filler.

2. The display device of claim 1, wherein
an overlapping part of the relay electrode overlaps the first lower electrode.

3. The display device of claim 2, wherein
a remaining part of the relay electrode does not overlap the first lower electrode, and
an area of the overlapping part is smaller than an area of the remaining part.

4. The display device of claim 1, further comprising:
a second lower electrode,
wherein
both of the first lower electrode and the second lower electrode are in a same layer,
the second lower electrode is provided adjacent to the first lower electrode, and
the first middle electrode overlaps the first lower electrode, the relay electrode, and the second lower electrode.

5. The display device of claim 4, wherein
a space is provided between the outer edge of the first lower electrode and an outer edge of the second lower electrode, and
the through hole is provided in the space.

6. The display device of claim 5, wherein
the first lower electrode, the second lower electrode, and the space are covered with the second insulating film and the first upper electrode.

7. The display device of claim 5, wherein
the switching element includes a gate electrode, and
the gate electrode overlaps the second lower electrode, and does not overlap the first lower electrode.

8. The display device of claim 7, wherein
the gate electrode, the first lower electrode, the second lower electrode, and the space are covered with the second insulating film and the first upper electrode.

9. The display device of claim 4, further comprising:
a display area including the first middle electrode and provided on the substrate;
a surrounding area defining the display area; and
a potential supply line provided on the substrate in the surrounding area,
wherein
the first lower electrode, the second lower electrode, and the first upper electrode are connected to the potential supply line.

10. The display device of claim 9, wherein each of the first lower electrode and the second lower electrode extends from one side of the surrounding area to another side of the surrounding area across the display area, and the first upper electrode covers an entirety of the display area and a part of the surrounding area.

11. The display device of claim 10, wherein
the first lower electrode, the second lower electrode, and the first upper electrode overlap at least a part of the potential supply line at the surrounding area in plan view.

12. The display device of claim 11, wherein the first lower electrode, the second lower electrode, and the first upper electrode are connected to the potential supply line at the one side and another side of the surrounding area.

13. The display device of claim 1, further comprising:
a display area including the first middle electrode and provided on the substrate;
a surrounding area defining the display area; and a potential supply line provided on the substrate in the surrounding area, wherein the first lower electrode and the first upper electrode are connected to the potential supply line.

14. The display device of claim 13, wherein the first lower electrode extends from one side of the surrounding area to another side of the surrounding area across the display area, and the first upper electrode covers an entirety of the display area and a part of the surrounding area.

15. The display device of claim 14, wherein the first lower electrode and the first upper electrode overlap at least a part of the potential supply line at the surrounding area in plan view.

16. The display device of claim 15, wherein the first lower electrode and the first upper electrode are connected to the potential supply line at the one side and another side of the surrounding area.

17. The display device of claim 1, wherein the second insulating film comprises a second layer covering the first middle electrode, the first layer located above the second layer, and the filler located between the second layer and the first layer and overlapping the through hole.

18. The display device of claim 17, wherein the first layer and the second layer are formed of an inorganic insulating material, and the filler is formed of an organic insulating material.

19. The display device of claim 1, wherein the second insulating film is thicker than the first insulating film.

20. The display device of claim 19, wherein a thickness of the second insulating film is two times or more a thickness of the first insulating film.

\* \* \* \* \*